(12) United States Patent
Taya et al.

(10) Patent No.: US 10,795,496 B2
(45) Date of Patent: Oct. 6, 2020

(54) METHOD FOR SELECTING WRITING SHEET FOR STYLUS, TOUCHSCREEN SYSTEM, WRITING SHEET FOR STYLUS, TOUCHSCREEN, AND DISPLAY DEVICE

(71) Applicant: DAI NIPPON PRINTING CO., LTD., Tokyo (JP)

(72) Inventors: Shubou Taya, Kyoto (JP); Yosuke Takayama, Okayama (JP); Tomohiro Ogawa, Tsukuba (JP); Jun Tsujimoto, Bizen (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 120 days.

(21) Appl. No.: 16/307,078

(22) PCT Filed: May 31, 2017

(86) PCT No.: PCT/JP2017/020225
§ 371 (c)(1),
(2) Date: Mar. 4, 2019

(87) PCT Pub. No.: WO2017/212996
PCT Pub. Date: Dec. 14, 2017

(65) Prior Publication Data
US 2019/0196651 A1    Jun. 27, 2019

(30) Foreign Application Priority Data

Jun. 6, 2016 (JP) .................................. 2016-112971

(51) Int. Cl.
*G06F 3/041* (2006.01)
*H04R 7/04* (2006.01)
*H04R 1/02* (2006.01)

(52) U.S. Cl.
CPC ............ *G06F 3/0416* (2013.01); *G06F 3/041* (2013.01); *H04R 7/045* (2013.01); *H04R 1/028* (2013.01); *H04R 2499/15* (2013.01)

(58) Field of Classification Search
CPC ...... G06F 3/0416; G06F 3/04; G06F 3/03545; H04R 7/045; H04R 2499/15; H04R 1/028
See application file for complete search history.

(56) References Cited

U.S. PATENT DOCUMENTS 5,308,936 A * 5/1994 Biggs ..................... G06F 3/043
178/18.04
7,157,649 B2 * 1/2007 Hill ....................... G06F 3/0433
178/18.01

(Continued)

FOREIGN PATENT DOCUMENTS

JP    2014097649 A    5/2014
JP    2014109712 A    6/2014
(Continued)

OTHER PUBLICATIONS

International Search Report issued for International Patent Application No. PCT/JP2017/020225, dated Jul. 11, 2017, 3 pages including English translation.

*Primary Examiner* — Yogeshkumar Patel
(74) *Attorney, Agent, or Firm* — Hamre, Schumann, Mueller & Larson, P.C.

(57) ABSTRACT

It is intended to provide a method for selecting a writing sheet for a touch panel pen that can accurately select a writing sheet with which the generation of unpleasant sounds during writing is suppressed. According to the method for selecting a writing sheet for a touch panel pen, a sheet satisfying condition 1-1 and condition 1-2 described below is selected as a writing sheet for a touch panel pen. <condition 1-1> Sound generated when writing is performed (Continued)

under predetermined conditions using a touch panel pen on the surface of a writing sheet for a touch panel pen is recorded. The sound pressure (dB/Hz) is calculated for each 1 Hz from the recorded sound by means of fast Fourier transform. The values of the dB/Hz at frequencies from 1 Hz to 20,000 Hz are normalized to have a maximum value of 100 and a minimum value of 0, and the normalized values of dB/Hz are adopted as rated sound pressures P. The frequencies from 1 Hz to 20,000 Hz are divided into ten segments of 2,000 Hz each, and integrated values of the rated sound pressures P of each segment are calculated. When the integrated value of the rated sound pressures P for frequencies of 1 Hz or more and less than 2,000 Hz as a first segment is represented by $P_1$, and the integrated value of the rated sound pressures P for frequencies of 18,000 Hz or more and 20,000 Hz or less as a tenth segment is represented by $P_{10}$, $P_1/P_{10}$ is 1.25 or more. <condition 1-2> When a standard deviation σ of the integrated values of the rated sound pressures P of the ten segments is calculated, σ is 13,500 or less.

6 Claims, 5 Drawing Sheets

(56) References Cited

U.S. PATENT DOCUMENTS

| | | | |
|---|---|---|---|
| 9,417,754 B2* | 8/2016 | Smith | G06F 3/0414 |
| 9,498,708 B2* | 11/2016 | Masuda | A63F 13/10 |
| 9,563,291 B2 | 2/2017 | Hosaka et al. | |
| 9,862,855 B2* | 1/2018 | Yokoyama | G06F 3/041 |
| 10,013,094 B1* | 7/2018 | Smith | G06F 3/0414 |
| 10,031,607 B1* | 7/2018 | Smith | G06F 9/4843 |
| 10,133,547 B2* | 11/2018 | Fleureau | G06F 3/167 |
| 10,222,891 B1* | 3/2019 | Smith | G06F 9/4843 |
| 10,656,752 B1* | 5/2020 | Smith | G06F 3/04883 |
| 10,656,754 B1* | 5/2020 | Smith | G06F 3/04883 |
| 10,656,759 B1* | 5/2020 | Smith | G06F 3/0414 |
| 10,664,097 B1* | 5/2020 | Smith | G06F 3/044 |
| 2004/0047505 A1* | 3/2004 | Ghassabian | G06K 9/00 382/186 |
| 2006/0161992 A1* | 7/2006 | Kempf | G06K 9/00154 726/34 |
| 2010/0220078 A1* | 9/2010 | Zloter | G06F 3/0433 345/177 |
| 2011/0090761 A1* | 4/2011 | Nishino | G06F 3/0433 367/127 |
| 2011/0248941 A1* | 10/2011 | Abdo | G06F 3/0488 345/173 |
| 2013/0093733 A1* | 4/2013 | Yoshida | G06F 3/0321 345/179 |
| 2013/0229371 A1* | 9/2013 | Lee | G06F 3/0483 345/173 |
| 2013/0268847 A1* | 10/2013 | Kim | G06F 3/0483 715/251 |
| 2014/0043242 A1* | 2/2014 | Dietz | G06F 3/016 345/173 |
| 2014/0253478 A1* | 9/2014 | Jeong | G06F 3/041 345/173 |
| 2014/0340326 A1* | 11/2014 | Kameyama | G06F 3/0383 345/173 |
| 2014/0368455 A1* | 12/2014 | Croisonnier | G06F 3/044 345/173 |
| 2015/0160745 A1* | 6/2015 | Hosaka | G06F 3/041 345/179 |
| 2016/0132136 A1* | 5/2016 | Otsuki | G06F 3/0386 345/179 |
| 2016/0139694 A1* | 5/2016 | Go | G06F 3/03545 345/179 |
| 2016/0162178 A1* | 6/2016 | Fukumura | G06F 3/0433 345/174 |
| 2016/0236975 A1* | 8/2016 | Sugimoto | C03C 3/093 |
| 2016/0364027 A1* | 12/2016 | Bernstein | G06F 3/0488 |
| 2017/0068339 A1* | 3/2017 | Zimmerman | G06F 3/03545 |
| 2018/0364400 A1* | 12/2018 | Eguchi | G02B 5/0226 |
| 2018/0364822 A1* | 12/2018 | Taya | G06F 1/1643 |

FOREIGN PATENT DOCUMENTS

| | | |
|---|---|---|
| JP | 2015109048 A | 6/2015 |
| JP | 2015114939 A | 6/2015 |
| WO | 2015072297 A1 | 5/2015 |

* cited by examiner

[Fig. 1]
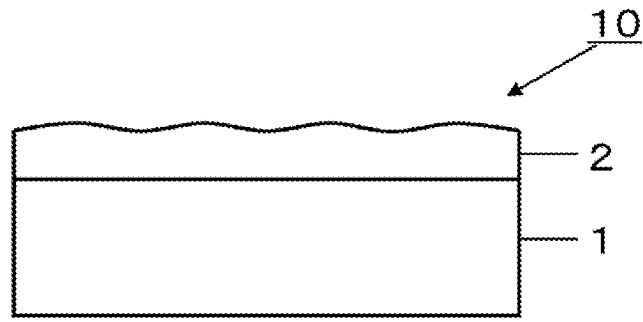
[Fig. 2]
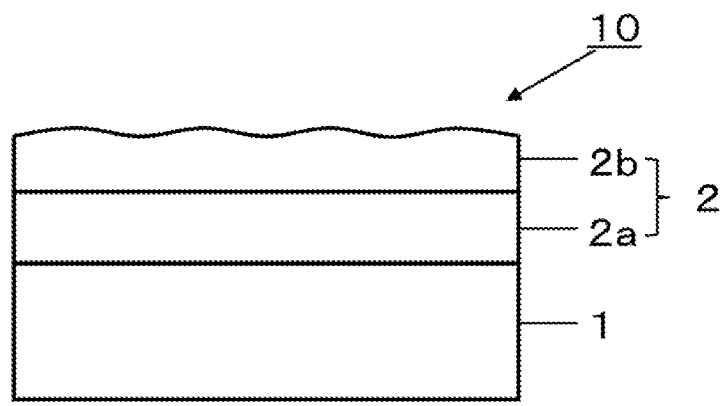
[Fig. 3]
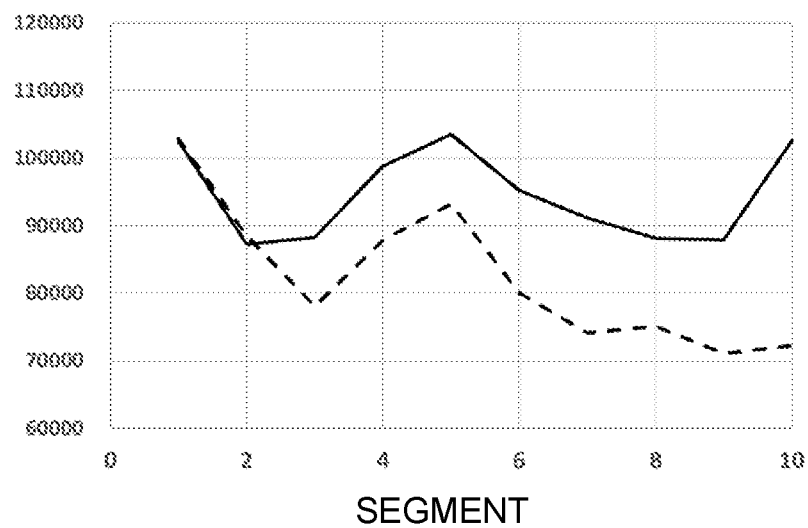

[Fig. 4]
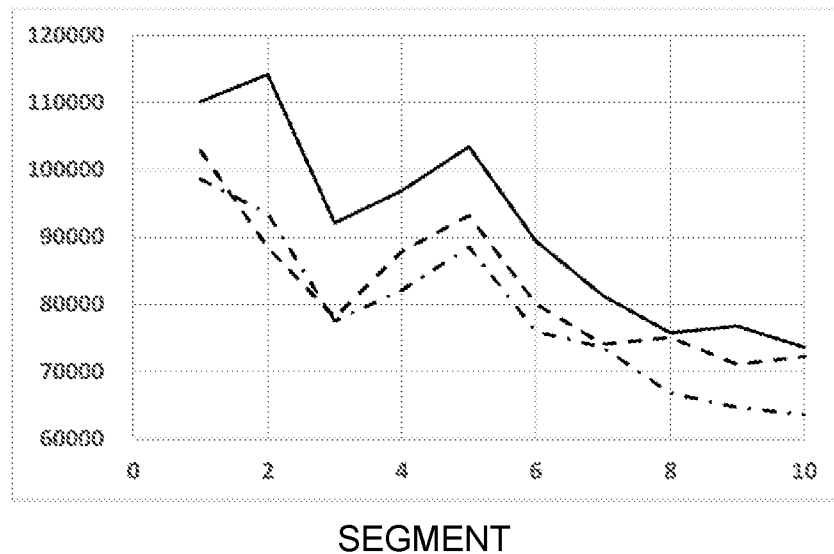
SEGMENT
[Fig. 5]
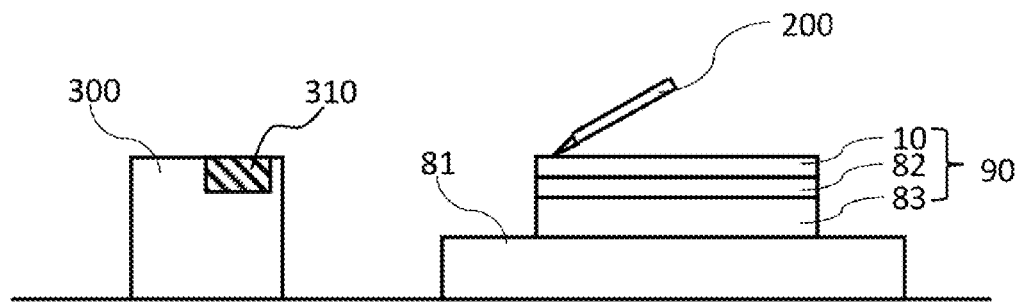
[Fig. 6]
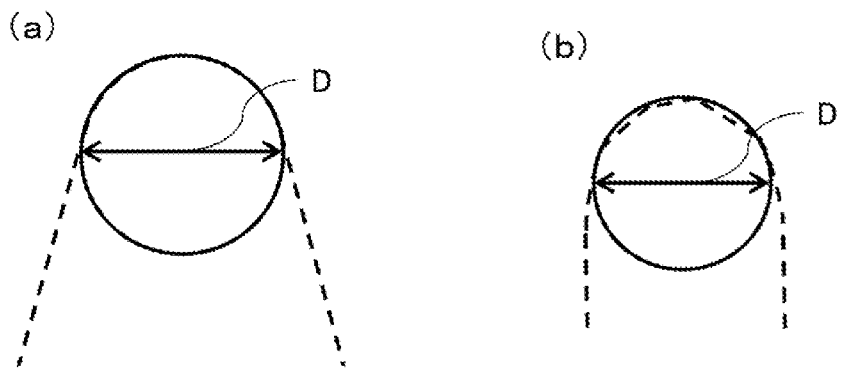

[Fig. 7]
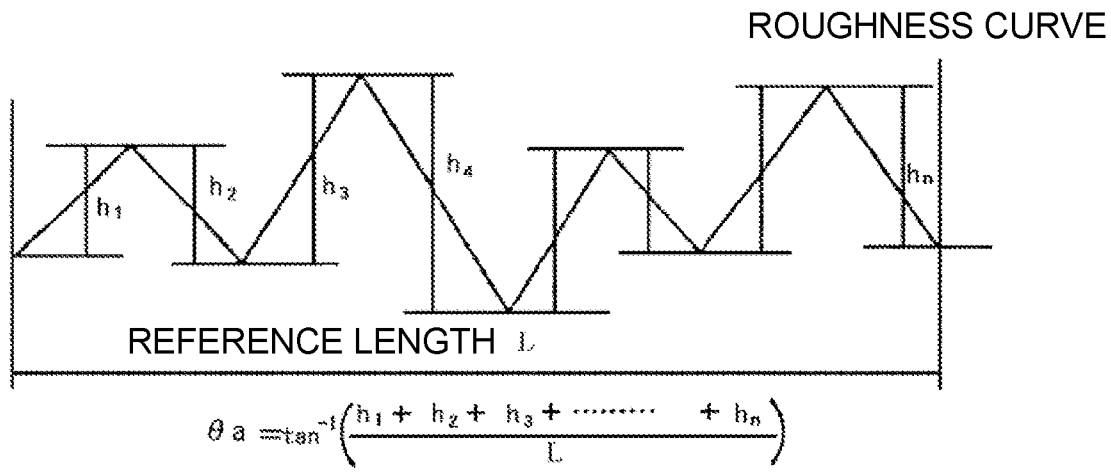
[Fig. 8]
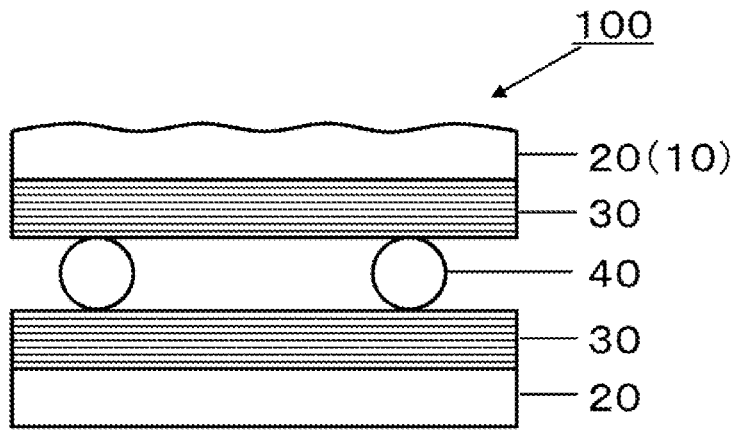
[Fig. 9]
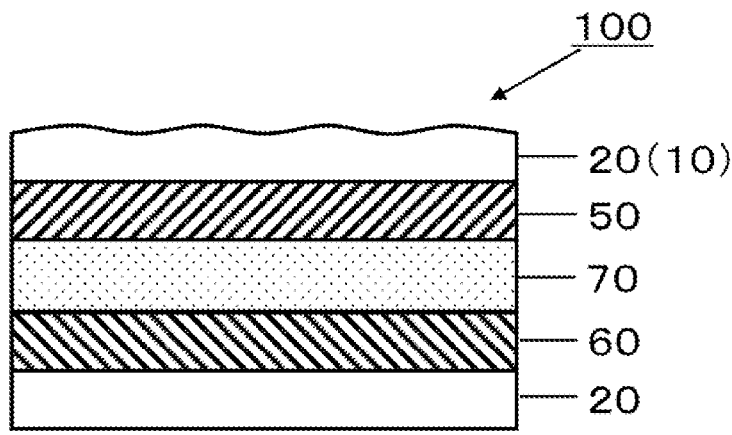

[Fig. 10]
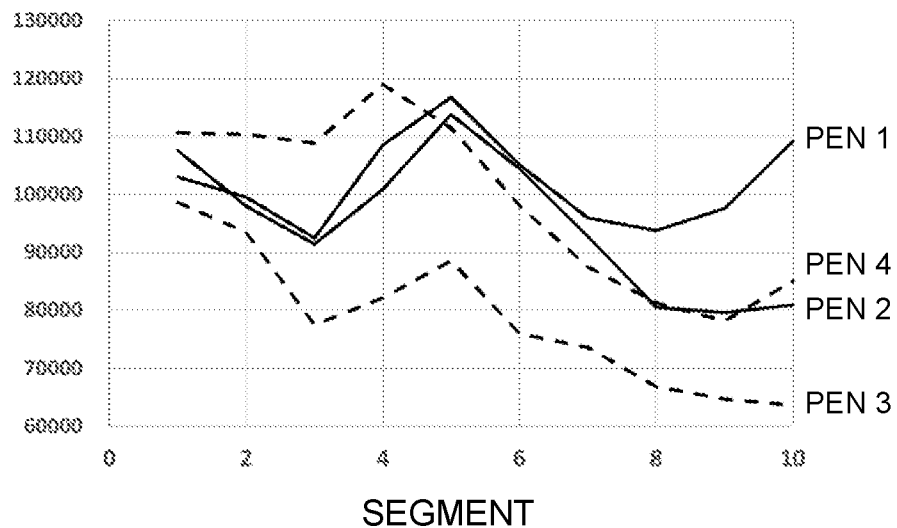
[Fig. 11]
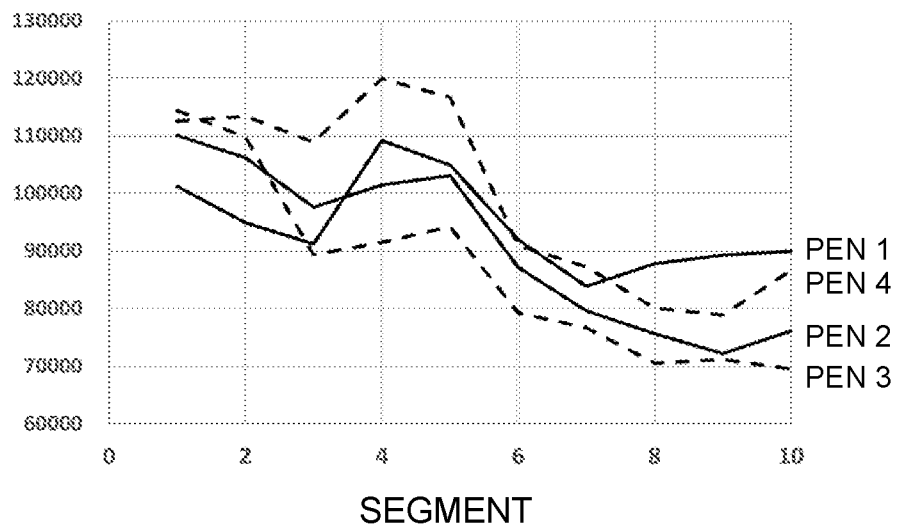

[Fig. 12]
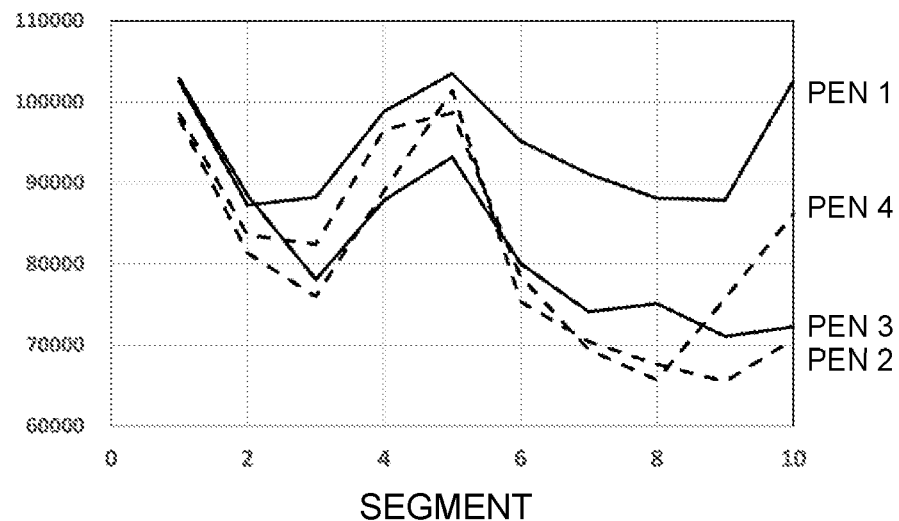
[Fig. 13]
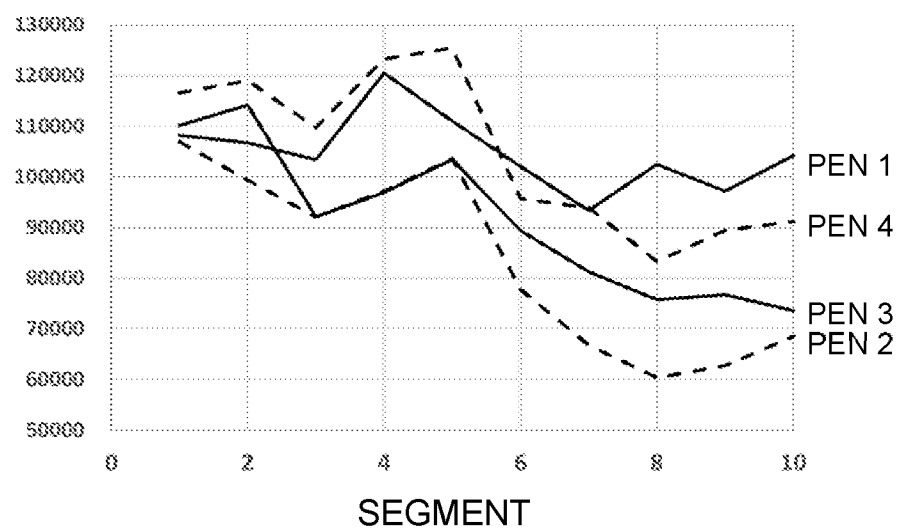

METHOD FOR SELECTING WRITING SHEET FOR STYLUS, TOUCHSCREEN SYSTEM, WRITING SHEET FOR STYLUS, TOUCHSCREEN, AND DISPLAY DEVICE

TECHNICAL FIELD

The present invention relates to a method for selecting a writing sheet for a touch panel pen, a touch panel system, a writing sheet for a touch panel pen, a touch panel, and a display device.

BACKGROUND ART

In recent years, the distribution of touch panels has been increasing, partly because the touch panels are installed in many handheld terminals. Surface protective sheets may be attached to the surfaces of the touch panels for various purposes.

Resistive touch panels, which have previously been mainstream, are repetitively tapped with fingers or a pen to operate. Therefore, their surface protective sheets are required to have a high level of scratch resistance.

On the other hand, the surface protective sheets for capacitive touch panels, which are currently mainstream, are required to have slipperiness for operating the capacitive touch panels with fingers. Since the conventional resistive touch panels cannot sense a plurality of locations at the same time, fingers are not moved on their screens. By contrast, the capacitive touch panels are capable of sensing a plurality of locations at the same time and thus often undergo operation based on movement with fingers on their screens.

The surface protective sheets for touch panels are required to have the capability of preventing fingerprint smudge upon operation with fingers or facilitating wiping off such fingerprint smudge, in common between the resistive and capacitive touch panels.

The surface protective sheets for touch panels as described above have been proposed in, for example, PTL1 and PTL2.

CITATION LIST

Patent Literature

PTL1: JP 2015-114939 A
PTL2: JP 2014-109712 A
PTL3: JP 2014-097649 A

SUMMARY OF INVENTION

Technical Problem

Capacitive touch panels recognize a touched location by measuring change in capacitance. Therefore, touching objects need to have a given conductivity. Hence, in the early days of appearance of the capacitive touch panels, only operability with fingers has been studied, and writability to draw characters or pictures with touch panel pens, for example, has not been studied. For resistive touch panels as well, the operation using touch panel pens is typically tapping, and writability to draw characters or pictures has not been emphasized.

However, in recent years, touch panel pens capable of entry in capacitive touch panels or electromagnetic touch panels have started to be proposed, and an increasing number of applications have responded to character entry or drawing with touch panel pens. For these reasons, surface protective sheets for touch panels are required to offer favorable writing feeling with touch panel pens.

However, most of the conventional surface protective sheets for touch panels that have been proposed, as typified by the surface protective sheets proposed in PTL1 and PTL2, have made no discussion about writing feeling with touch panel pens.

On the other hand, in PTL3, with the object of imparting a writing sensation that is comparable to pencil writing on paper, a surface protective sheet for touch panels is disclosed that has a surface shape in which the maximum height of rolling circle waviness profile is 15 μm or more.

The present inventors studied the technology disclosed in PTL3, and as a result found that, although a predetermined effect was confirmed in relation to the writing sensation, there were many cases in which the person who was writing felt an unpleasant feeling during writing.

Solution to Problem

As the result of studies that were conducted by the present inventors regarding the unpleasant feeling that was felt during writing, the present inventors discovered that "sound" that is generated during writing is the cause of the unpleasant feeling.

In recent years, tablet terminals equipped with a touch panel function are used in an increasing number of cases during school lessons. In a case where a large number of people write on tablet terminals during a school lesson, even if the sound generated from the individual tablet terminals is small, the sound that arises in the classroom as a whole is large, and the sound may become a hindrance to the progress of the lesson. Further, even in a case where a tablet terminal is being operated by one person, if the surrounding environment is extremely quiet, the writing sound will be easily heard by the person who is writing.

The present inventors have conducted concentrated studies regarding sounds which do not cause a person to feel an unpleasant feeling when writing, and succeeded in solving the above problem.

The present invention provides a method for selecting a writing sheet for a touch panel pen, a touch panel system, a writing sheet for a touch panel pen, a touch panel and a display device that are described in the following [1] to [6]:

[1] A method for selecting a writing sheet for a touch panel pen, comprising selecting a sheet that satisfies the following conditions 1-1 and 1-2, as the writing sheet for a touch panel pen:

<Condition 1-1> a sound that arises when a touch panel pen is brought into contact with a surface of a writing sheet for a touch panel pen at an acute angle of 25 to 35 degrees and, while maintaining the angle, a vertical load of 45 to 55 gf is applied to the touch panel pen and the touch panel pen is reciprocatingly moved 45 to 55 mm in one-way length at a rate of 180 to 220 mm/sec is recorded;

when recording, the sound is converted from an analog signal to a digital signal at a sampling frequency of 44.1 kHz and recorded; a soundless portion is added to before and after the sound converted into a digital signal so that an overall time period of the digital signal becomes 0.7 seconds; the digital signal to which the soundless portion has been added is subjected to fast Fourier transform in which a range of variables is 1 Hz to 22,000 Hz and the Hanning window is adopted as a window function, and a sound pressure (dB/Hz) is calculated for each 1 Hz;

values of the dB/Hz at frequencies from 1 Hz to 20,000 Hz are normalized to have a maximum value of 100 and a minimum value of 0; the normalized values of dB/Hz are adopted as rated sound pressures P; the frequencies from 1 Hz to 20,000 Hz are divided into ten segments of 2,000 Hz each, and integrated values of the rated sound pressures P of each segment are calculated; when an integrated value of the rated sound pressures P for frequencies of 1 Hz or more to less than 2,000 Hz that is a first segment is represented by $P_1$, and an integrated value of the rated sound pressures P for frequencies of 18,000 Hz or more to 20,000 Hz or less that is a tenth segment is represented by $P_{10}$, $P_1/P_{10}$ exhibits a value of 1.25 or more; and <Condition 1-2> when a standard deviation σ of the integrated values of the rated sound pressures P of the ten segments is calculated, σ exhibits a value of 13,500 or less.

[2] The method for selecting a writing sheet for a touch panel pen according to according to [1] above, further comprising selecting the sheet that satisfies the following condition 2-1 as the writing sheet for a touch panel pen:

<Condition 2-1> an arithmetic average roughness Ra defined in JIS B0601: 2001 with a cutoff value of 0.8 mm of the surface is 0.2 μm in or more and 0.8 μm in or less.

[3] A touch panel system comprising: a touch panel comprising a writing sheet for a touch panel pen on a surface; and a touch panel pen, wherein the touch panel system satisfies the conditions 1-1 and 1-2.

[4] A writing sheet for a touch panel pen having a surface that satisfies the conditions 1-1 and 1-2.

[5] A touch panel comprising a sheet on a surface, wherein a writing sheet for a touch panel pen according to [4] is placed such that the side of the writing sheet that satisfies the conditions 1-1 and 1-2 faces the surface of the touch panel.

[6] A display device with a touch panel, the display device comprising the touch panel on a display component, wherein the touch panel is a touch panel according to [5].

Advantageous Effects of Invention

The method for selecting a writing sheet for a touch panel pen according to the present invention can accurately select a writing sheet with which the generation of unpleasant sounds during writing is suppressed. Thus efficient product design and quality control of writing sheets can be achieved. Further, the touch panel system, the writing sheet for a touch panel pen, the touch panel and the display device of the present invention can suppress the generation of unpleasant sounds during writing.

BRIEF DESCRIPTION OF DRAWINGS

FIG. 1 is a cross-sectional view showing one embodiment of the writing sheet for a touch panel pen of the present invention.

FIG. 2 is a cross-sectional view showing another embodiment of the writing sheet for a touch panel pen of the present invention.

FIG. 3 is a diagram showing one example of graphs in which the ordinate depicts integrated values of rated sound pressures P of respective segments calculated in accordance with the condition 1-1, and the abscissa depicts a first segment to a tenth segment.

FIG. 4 is a diagram showing another example of graphs in which the ordinate depicts integrated values of rated sound pressures P of respective segments calculated in accordance with the condition 1-1, and the abscissa depicts the first segment to the tenth segment.

FIG. 5 is a diagrammatic view illustrating a method for measuring sound.

FIG. 6 is a diagram illustrating a method for calculating diameter D of a touch panel pen.

FIG. 7 is a diagram illustrating a method for calculating average tilt angle θa.

FIG. 8 is a cross-sectional view showing one embodiment of the touch panel of the present invention.

FIG. 9 is a cross-sectional view showing another embodiment of the touch panel of the present invention.

FIG. 10 is a diagram showing one example of graphs in which the ordinate depicts integrated values of rated sound pressures P of respective segments calculated in accordance with the condition 1-1, and the abscissa depicts a first segment to a tenth segment with respect to a time of using a writing sheet for a touch panel pen of Experimental Example 1 as a writing sheet for a touch panel pen, and using touch panel pens 1 to 4 of the Examples as touch panel pens.

FIG. 11 is a diagram showing one example of graphs in which the ordinate depicts integrated values of rated sound pressures P of respective segments calculated in accordance with the condition 1-1, and the abscissa depicts a first segment to a tenth segment with respect to a time of using a writing sheet for a touch panel pen of Experimental Example 2 as a writing sheet for a touch panel pen, and using touch panel pens 1 to 4 of the Examples as touch panel pens.

FIG. 12 is a diagram showing one example of graphs in which the ordinate depicts integrated values of rated sound pressures P of respective segments calculated in accordance with the condition 1-1, and the abscissa depicts a first segment to a tenth segment with respect to a time of using a writing sheet for a touch panel pen of Experimental Example 3 as a writing sheet for a touch panel pen, and using touch panel pens 1 to 4 of the Examples as touch panel pens.

FIG. 13 is a diagram showing one example of graphs in which the ordinate depicts integrated values of rated sound pressures P of respective segments calculated in accordance with the condition 1-1, and the abscissa depicts a first segment to a tenth segment with respect to a time of using a writing sheet for a touch panel pen of Experimental Example 4 as a writing sheet for a touch panel pen, and using touch panel pens 1 to 4 of the Examples as touch panel pens.

DESCRIPTION OF EMBODIMENTS

Hereinafter, embodiments of the method for selecting a writing sheet for a touch panel pen, the touch panel system, the writing sheet for a touch panel pen, the touch panel and the display device of the present invention are described.

[Method for Selecting Writing Sheet for Touch Panel Pen]

The method for selecting a writing sheet for a touch panel pen of the present invention comprises selecting a sheet that satisfies the following conditions 1-1 and 1-2 as the writing sheet for a touch panel pen:

<Condition 1-1> a sound that arises when a touch panel pen is brought into contact with a surface of a writing sheet for a touch panel pen at an acute angle of 25 to 35 degrees and, while maintaining the angle, a vertical load of 45 to 55 gf is applied to the touch panel pen and the touch panel pen is reciprocatingly moved 45 to 55 mm in one-way length at a rate of 180 to 220 mm/sec is recorded;

when recording, the sound is converted from an analog signal to a digital signal at a sampling frequency of 44.1 kHz and recorded; a soundless portion is added to before and after the sound converted into a digital signal so that an overall time period of the digital signal becomes 0.7 seconds; the digital signal to which the soundless portion has been added is subjected to fast Fourier transform in which a range of variables is 1 Hz to 22,000 Hz and the Hanning window is adopted as a window function, and a sound pressure (dB/Hz) is calculated for each 1 Hz;

values of the dB/Hz at frequencies from 1 Hz to 20,000 Hz are normalized to have a maximum value of 100 and a minimum value of 0; the normalized values of dB/Hz are adopted as rated sound pressures P; the frequencies from 1 Hz to 20,000 Hz are divided into ten segments of 2,000 Hz each, and integrated values of the rated sound pressures P of each segment are calculated; when an integrated value of the rated sound pressures P for frequencies of 1 Hz or more to less than 2,000 Hz that is a first segment is represented by $P_1$, and an integrated value of the rated sound pressures P for frequencies of 18,000 Hz or more to 20,000 Hz or less that is a tenth segment is represented by $P_{10}$, $P_1/P_{10}$ exhibits a value of 1.25 or more; and <Condition 1-2> when a standard deviation σ of the integrated values of the rated sound pressures P of the ten segments is calculated, σ exhibits a value of 13,500 or less.

The term "acute angle of 25 to 35 degrees" means being inclined at an angle within a range of 25 to 35 degrees with respect to the sheet surface when the direction parallel to the surface of the writing sheet for a touch panel pen is defined as 0 degrees.

Each of FIGS. 1 and 2 is a cross-sectional view showing one embodiment of writing sheet 10 for a touch panel pen of the present invention. The writing sheet 10 for a touch panel pen shown in FIGS. 1 and 2 has a resin layer 2 on one side of base material 1.

In the writing sheet for a touch panel pen of the present invention, one of the surfaces may satisfy the conditions 1-1 and 1-2, or both of the surfaces may satisfy the conditions 1-1 and 1-2.

Hereinafter, the writing sheet for a touch panel pen is also referred to as "writing sheet". Hereinafter, the surface that satisfies the conditions 1-1 and 1-2 is also referred to as "writing surface".

<Writing Surface>

The method for selecting a writing sheet for a touch panel pen of the present invention comprises selecting a sheet that satisfies the aforementioned conditions 1-1 and 1-2 as the writing sheet for a touch panel pen.

In order to identify sounds that cause an unpleasant feeling during writing, the present inventors wrote on writing sheets using various combinations of writing sheets and touch panel pens, and investigated the waveforms of sounds that were generated when writing.

FIGS. 3 and 4 are diagrams that each show an example of graphs in which the ordinate depicts integrated values of rated sound pressures P of respective segments that were calculated in accordance with the aforementioned condition 1-1, and the abscissa depicts a first segment to a tenth segment. The segments were obtained by dividing the frequency every 2,000 Hz, with the first segment being from a frequency of 0 Hz or more to less than 2,000 Hz, and the tenth segment being from a frequency of 18,000 Hz or more to 20,000 Hz or less. Because the sound pressures were normalized according to the condition 1-1, differences in the frequency distribution of the sound pressures depending on the combinations of the writing sheet and the touch panel pen can be ascertained by comparing the respective graphs.

The solid line in FIG. 3 is a graph obtained when writing was performed using a combination of a writing sheet of Experimental Example 3 of the Examples and a touch panel pen 1. The dashed line in FIG. 3 is a graph obtained when writing was performed using a combination of the writing sheet of Experimental Example 3 of the Examples and a touch panel pen 3.

In the solid line in FIG. 3, the integrated values of the sound pressures on the high frequency side and the low frequency side are around the same level. In other words, in the case of the solid line in FIG. 3, the frequency dependence of the sound pressure is small. On the other hand, in the case of the dashed line in FIG. 3, the sound pressures on the low frequency side exhibit a substantially large value compared to the sound pressures on the high frequency side.

Upon conducting a large number of verification tests, the present inventors found that, within a predetermined range of writing conditions (the angle, load, rate, and distance of pen are within a predetermined range) defined by the condition 1-1, in comparison to a case where the integrated values of the sound pressures on the high frequency side and the low frequency side are around the same level as indicated by the solid line in FIG. 3, in a case where the sound pressure on the low frequency side exhibits a substantially large value compared to the sound pressure on the high frequency side as indicated by the dashed line in FIG. 3, it tends to be harder to receive an unpleasant feeling during writing.

As described above, it tends to be harder to receive an unpleasant feeling during writing in a case where the sound pressure on the low frequency side exhibits a substantially large value compared to the sound pressure on the high frequency side. However, results of studies conducted by the present inventors showed that even when the sound pressure on the low frequency side exhibited a substantially large value compared to the sound pressure on the high frequency side, there were some cases in which an unpleasant feeling was received from sound generated during writing.

The solid line in FIG. 4 is a graph obtained when writing was performed using a combination of a writing sheet of Experimental Example 4 of the Examples and the touch panel pen 3. The dashed line in FIG. 4 is a graph obtained when writing was performed using a combination of the writing sheet of Experimental Example 3 of the Examples and the touch panel pen 3. The chain line in FIG. 4 is a graph obtained when writing was performed using a combination of a writing sheet of Experimental Example 1 of the Examples and the touch panel pen 3.

In each of the solid line, the dashed line and the chain line in FIG. 4, the sound pressure on the low frequency side exhibits a substantially large value compared to the sound pressure on the high frequency side. However, although according to the dashed line and the chain line in FIG. 4, an unpleasant feeling is not received from sound generated during writing, in the case of the waveform indicated by the solid line in FIG. 4, an unpleasant feeling is received from sound generated during writing.

Upon conducting a large number of verification tests, the present inventors found that, within a predetermined range of writing conditions (the angle, load, rate, and distance of pen are within a predetermined range), in a case where variations in the integrals of sound pressures are large as in the case of the solid line of FIG. 4, even if the sound pressure on the low frequency side is substantially large compared to the sound pressure on the high frequency side, an unpleasant feeling is received from sound generated during writing. It is considered that in a case where variations in the integrals of sound pressures are large, it is easy to receive an unpleasant feeling because it becomes easy to hear sounds of specific frequency bands.

According to the condition 1-1, an integrated value of sound pressure on the low frequency side exhibits a substantially large value compared to an integrated value of sound pressure on the high frequency side. Further, according to the condition 1-2, variations in the integrated values of sound pressures are small. Therefore, by satisfying the conditions 1-1 and 1-2, unpleasant sounds during writing can be suppressed.

With respect to the condition 1-1, $P_1/P_{10}$ is preferably 1.30 or more, more preferably 1.35 or more, and further preferably 1.40 or more.

In a case where $P_1/P_{10}$ is too large, there is a tendency to perceive a generated sound as unnatural due to a sound pressure difference between the high frequency side and the low frequency side being too large. Therefore, $P_1/P_{10}$ is preferably not more than 1.55, and more preferably not more than 1.50.

With respect to the condition 1-2, σ is preferably not more than 12,500, more preferably not more than 12,000, and further preferably not more than 11,500.

In a case where σ is too small, there is a tendency to perceive a generated sound as unnatural due to variations in the sound pressures decreasing when changing from a low frequency toward a high frequency. Therefore, σ is preferably not less than 8,500, and more preferably not less than 9,500.

In the present invention, the sound parameters for the aforementioned conditions 1-1 and 1-2 and the like, the parameter for surface shape of a condition 2-1 that is described later and the like, and an optical parameter of a condition 3-1 described later and the like are set to the corresponding average value of measured values at 10 locations.

FIG. 5 is a diagrammatic view illustrating a method for recording sound.

First, a touch panel pen 200 is brought into contact with the surface of the writing sheet 10 for a touch panel pen at an acute angle within a range of 25 to 35 degrees. The term "acute angle of 25 to 35 degrees" means being inclined at an angle within a range of 25 to 35 degrees with respect to the sheet surface when the direction parallel to the surface of the writing sheet 10 for a touch panel pen is defined as 0 degrees.

During writing, a sound that is generated when the aforementioned angle is maintained and a vertical load of 45 to 55 gf is applied to the touch panel pen 200, and the touch panel pen is reciprocatingly moved 45 to 55 mm in one-way length at a rate of 180 to 220 mm/sec is recorded. The direction of the reciprocating movement is the direction parallel to the orientation of the axis of the touch panel pen 200. With regard to FIG. 5, first, the touch panel pen 200 is moved 45 to 55 mm to the right side, and next the touch panel pen 200 is moved 45 to 55 mm to the left side. The writing rate can be calculated by dividing the moving distance of the touch panel pen by the writing time period.

Regarding the angle of the touch panel pen 200 during writing, a moving image from the start of writing to the end of writing is photographed, and the measurement condition is deemed to be satisfied if the angle of the touch panel pen 200 is continuously within the range of 25 to 35 degrees.

Regarding the vertical load of the touch panel pen 200, for example, as illustrated in FIG. 5, the writing sheet 10 for a touch panel pen is placed on an electronic balance 81, and a moving image of the value of the electronic balance 81 from the start of writing to the end of writing is photographed, and the measurement condition is deemed to be satisfied if the value during writing is continuously within the range of 45 to 55 g. Because writing momentarily stops and the sound decreases when reversing the direction of movement of the touch panel pen, the load at such time may be outside the range of 45 to 55 g, although the load is preferably within the range of 40 to 60 g.

It suffices that the moving distance of the touch panel pen is within the range of 45 to 55 mm in one direction, and the distance of the outward route and the distance of the return route may be different from each other.

If oil or fat (for example, fingerprint components transferred from the finger of a person) adheres to the surface of the writing sheet for a touch panel pen and the nib of the touch panel pen, there is a possibility that the oil or fat will affect the sound. Therefore, when recording the sound, it is preferable to perform recording after ensuring that oil or fat is not adhered to the surface of the writing sheet for a touch panel pen and the nib of the touch panel pen. Further, in a case where oil or fat adheres to the surface of the writing sheet for a touch panel pen and the nib of the touch panel pen, it is preferable to record the sound after performing a degreasing treatment to a degree that does not affect the shape and properties of the surface of the writing sheet for a touch panel pen and the nib of the touch panel pen.

When recording the sound as described above, in order to reproduce the surface of a handheld terminal, it is preferable to prepare a sample in which the writing sheet 10 is laminated via a pressure-sensitive adhesive layer 82 onto a smooth substrate 83 such as a resin plate made of polymethacrylate, and to cause the touch panel pen to contact a surface on the writing sheet side of the sample. It is preferable to make the thickness of the substrate such as a resin plate made of polymethacrylate 2 mm. The thickness of the pressure-sensitive adhesive layer of the sample is preferably not more than 300 μm, and more preferably not more than 100 μm. If the thickness of the pressure-sensitive adhesive layer is not more than 300 μm, the pressure-sensitive adhesive layer has almost no influence on the sound.

As illustrated in FIG. 5, when recording the sound, it is preferable to match the height of a sound collector 300 such as a smartphone with the height of the writing surface. The distance between the sound collector 300 and the writing sheet 10 is preferably in the range of 1 to 15 cm. In addition, preferably the sound collector 300 is disposed so that a microphone portion 310 faces the writing sheet side, or the sound collector 300 is disposed so that the microphone portion 310 faces toward the upper side as shown in FIG. 5. It is also preferable that there is a space of 1.5 m or more above the sound collector 300 and the writing sheet 10. Furthermore, in the room in which the sound is recorded, the floor preferably has an area of 3 m×3 m or more.

In addition, to prevent reverberation of sound and the like, it is preferable to close doors and windows of the room in which the sound is recorded, and in a case where the room has windows, it is preferable to close the curtains so as not to expose the windows.

It is preferable that the environment in which the sound is recorded is quiet, and specifically it is preferable that the sound pressure is not more than 40 db. It is also preferable that various apparatuses such as ventilation fans, air conditioners and personal computers are not activated while recording the sound, even if the sound pressure of such apparatuses is a low level.

When performing recording, the sound is converted from an analog signal to a digital signal at a sampling frequency of 44.1 kHz and recorded. When converting to a digital signal, the amount of voltage fluctuation is preferably represented by 65536 levels (16 bits). More specifically, the recording is preferably performed as described in the following (1) to (3).

(1) Sound propagating through the air is converted to an electrical signal by a microphone or the like.
(2) The amplitude of the electrical signal is moderately amplified by an amplifier so that the sound can be clearly recorded.
(3) The amplified electrical signal is converted to a digital signal at a sampling frequency of 44.1 kHz with the amount of voltage fluctuation represented by 65536 levels (16 bits) and recorded.

Next, a soundless portion is added to the before and after the sound that has been converted to a digital signal, so that the overall time period of the digital signal becomes 0.7 seconds. By subjecting the digital signal to which the soundless portions have been added to fast Fourier transform (FFT transform) using a range of variables of 1 Hz to 22,000 Hz and adopting the Hanning window as a window function, the sound pressure (dB/Hz) can be calculated for each 1 Hz.

For the method for selecting a writing sheet according to the present invention, it is preferred to select a sheet that satisfies the following condition 1-3.

<Condition 1-3>

Among the aforementioned ten segments, a rated sound pressure of an $n^{th}$ segment is taken as "$P_n$". The number of segments for which $P_n/P_{10}$ is less than 1.0 is not more than two segments.

If the condition 1-3 is satisfied, it indicates that the number of segments for which the integrated value is less than the integrated value ($P_{10}$) of the segment with the highest frequency (18,000 Hz or more and 20,000 Hz or less) is small. By satisfying the condition 1-3, the sound is more likely to be perceived as a natural sound, and it is thereby possible to further suppress an unpleasant feeling caused by the sound during writing.

In the condition 1-3, the number of segments for which $P_n/P_{10}$ is less than 1.0 is more preferably not more than one segment, and further preferably is zero segments.

For the method for selecting a writing sheet according to the present invention, it is preferred to select a sheet that satisfies the following condition 1-4.

<Condition 1-4>

When the integrated value of the rated sound pressure P of the first segment is taken as "$P_1$", and the integrated value of the rated sound pressure P of the second segment is taken as "$P_2$", $P_2/P_1$ exhibits a value of 0.95 or less.

The sensitivity of humans is highest in the range of 2,000 Hz to 4,000 Hz that is the second segment. By satisfying the condition 1-4, sound in the second segment for which humans have a high sensitivity is made difficult to hear, and thus an unpleasant feeling caused by sound during writing can be suppressed more easily.

In the condition 1-4, $P_2/P_1$ is more preferably not more than 0.93, and further preferably is not more than 0.90.

If $P_2/P_1$ is too small, there is a tendency for sounds to be perceived as unnatural sounds. Therefore, $P_2/P_1$ is preferably 0.70 or more, more preferably is 0.75 or more, and further preferably is 0.80 or more.

For the method for selecting a writing sheet according to the present invention, it is preferred to select a sheet that satisfies the following condition 1-5.

<Condition 1-5>

When the integrated value of the rated sound pressure P of the second segment is taken as "$P_2$", and the integrated value of the rated sound pressure P of the third segment is taken as "$P_3$", $P_3/P_2$ exhibits a value of 0.80 or more.

The sensitivity of humans is highest in the range of 2,000 Hz to 4,000 Hz that is the second segment. By satisfying the condition 1-5, sound in the second segment for which humans have a high sensitivity is made difficult to hear, and thus an unpleasant feeling caused by sound during writing can be suppressed more easily.

In the condition 1-5, $P_3/P_2$ is more preferably 0.83 or more, and further preferably is 0.85 or more.

If $P_3/P_2$ is too large, there is a tendency for sounds to be perceived as unnatural sounds. Therefore, $P_3/P_2$ is preferably not more than 0.95, more preferably is not more than 0.93, and further preferably is not more than 0.90.

Although the touch panel pen for use in the determination of the respective conditions described above is not particularly limited, a touch panel pen in which the number of independently mobile long materials is not more than 200 in a cross-sectional photograph of the nib is preferable, and a touch panel pen in which the aforementioned number of long materials is not more than 70 is more preferable. Fibers and the like may be mentioned as examples of the long material. The term "mobile" means "movable when writing", and for example a metallic support does not have mobility.

If the number of independent long materials in a cross-sectional photograph of the nib is more than 200, the long materials will act like strings during writing and will generate sounds of various frequencies (particularly sounds on the high frequency side), and consequently it will be difficult to satisfy the conditions 1-1 and 1-2 and the like. On the other hand, when the number of independent long materials in a cross-sectional photograph of the nib is not more than 200, generation of sounds of various frequencies (particularly sounds on the high frequency side) during writing is suppressed, and it is easy to satisfy the conditions 1-1 and 1-2 and the like.

Among various independent long materials, independent fibers have a strong tendency for generating sounds of various frequencies (particularly sounds on the high frequency side) because the lengths of the respective fibers are different from each other. Therefore, as the touch panel pen, a touch panel pen in which, in a cross-sectional photograph of the nib, the number of independent fibers is not more than 200 is preferable, and a touch panel pen in which the number of independent fibers is not more than 70 is more preferable.

In a case where the touch panel pen is a multicolor type in which a plurality of tips can be selected and at least one of the tips satisfies the aforementioned condition, it is preferred to determine the above conditions using the tip that satisfies the aforementioned condition.

The number of independently mobile long materials can be calculated, for example, by means of image analysis software by binarizing an image that is a cross-sectional photograph of the nib, and counting the number of black parts whose entire circumference is surrounded by white.

It is preferred that the cross-sectional photograph of the nib is taken at a diametrical portion of the nib of the touch panel pen that is described later. Further, it is preferred that the magnification of the photograph is ×200.

For the touch panel pen for use in the determination of the respective conditions described above, the diameter of the nib is preferably 0.3 to 2.5 mm, more preferably 0.5 to 2.0 mm, further preferably 0.7 to 1.7 mm.

The diameter D of the nib is calculated with reference to a photograph of the touch panel pen taken from the vertical direction side with respect to the pen holder. In FIG. 6, the outside shape of the touch panel pen photographed from the vertical direction side with respect to the pen holder is indicated by a dotted line. As shown in FIG. 6(a), a circle is superimposed on the outside shape in the photograph such that the circle passes through the top of the outside shape and does not exceed the outside shape. In this respect, the diameter of the largest circle is defined as the diameter D of the nib. As shown in FIG. 6(b), however, if the outside shape in the photograph has an incline with an angle of 40 to 90 degrees with respect to the pen holder, the circle may be superimposed on the outside shape so as to exceed the incline.

Further, for the method for selecting a writing sheet according to the present invention, it is preferred to select a sheet that satisfies the following condition 2-1 as a writing sheet for a touch panel pen.

<Condition 2-1>

Arithmetic average roughness Ra defined in JIS B0601: 2001 with a cutoff value of 0.8 mm is 0.2 μm or more and 0.8 μm or less.

By making the Ra 0.2 μm or more, a writing feel can be easily imparted. By making Ra 0.8 μm or less, the writing feeling can be easily made a smooth feeling.

It is more preferred to make Ra 0.3 μm or more and 0.6 μm or less, and further preferred to make Ra 0.4 μm or more and 0.5 μm or less.

When measuring a surface shape such as Ra, it is preferred to prepare a sample in which the writing sheet is laminated via a pressure-sensitive adhesive layer onto a smooth substrate such as a resin plate made of polymethacrylate, and to fix the sample to a measuring device and thereafter measure the surface shape. It is preferred to make the thickness of the substrate 2 mm. Further, although the thickness of the pressure-sensitive adhesive layer is not particularly limited because the thickness does not substantially influence the value of surface shape, it is preferred to set the thickness within the range of approximately 10 to 300 μm.

When the Ra of the surface of the writing sheet is made 0.2 Ξm or more, although a writing feel can be easily imparted, on the other hand it is easy for a sound that causes an unpleasant feeling to arise. The configuration of a writing sheet that satisfies the condition 2-1 and hardly causes an unpleasant sounds is described later.

Further, for the method for selecting a writing sheet according to the present invention, it is preferred to select a sheet that satisfies the following condition 3-1.

<Condition 3-1>

The haze defined in JIS K7136: 2000 is 25.0% or more.

When the haze is 25.0% or more, scintillation (phenomenon in which fine variations in luminance are seen in screen image light) can be easily suppressed.

The haze is more preferably 35.0% or more, further preferably 45.0% or more, from the viewpoint of the suppression of scintillation. The haze is preferably 90.0% or less, more preferably 70.0% or less, further preferably 60.0% or less, from the viewpoint of the suppression of decrease in the resolution of a display component.

For the measurement of the haze and a total light transmittance mentioned later, light is incident on a surface opposite to the writing surface (surface that satisfies the conditions 1-1 and 1-2) of the writing sheet. When both the surfaces of the writing sheet are writing surfaces, the surface of light incidence may be either of the surfaces.

Further, for the method for selecting a writing sheet according to the present invention, it is preferred to select a sheet that satisfies the following condition 3-2.

<Condition 3-2>

The total light transmittance defined in JIS K7361-1: 1997 is 87.0% or more.

When the total light transmittance is 87.0% or more, decrease in the luminance of a display component can be suppressed.

The total light transmittance is more preferably 88.0% or more, further preferably 89.0% or more. Too high a total light transmittance tends to hinder the writing sheet from satisfying the condition 2-1. Therefore, the total light transmittance is preferably 92.0% or less, more preferably 91.5% or less, further preferably 91.0% or less.

By applying the method for selecting a writing sheet for a touch panel pen according to the present invention, a touch panel pen that is suitable for an arbitrary writing sheet can also be selected.

[Writing Sheet for Touch Panel Pen]

The writing sheet for a touch panel of the present invention has a surface that satisfies the following conditions 1-1 and 1-2:

<Condition 1-1> a sound that arises when a touch panel pen is brought into contact with a surface of a writing sheet for a touch panel pen at an acute angle of 25 to 35 degrees and, while maintaining the angle, a vertical load of 45 to 55 gf is applied to the touch panel pen and the touch panel pen is reciprocatingly moved 45 to 55 mm in one-way length at a rate of 180 to 220 mm/sec is recorded;

when recording, the sound is converted from an analog signal to a digital signal at a sampling frequency of 44.1 kHz and recorded; a soundless portion is added to before and after the sound converted into a digital signal so that an overall time period of the digital signal becomes 0.7 seconds; the digital signal to which the soundless portion has been added is subjected to fast Fourier transform in which a range of variables is 1 Hz to 22,000 Hz and the Hanning window is adopted as a window function, and a sound pressure (dB/Hz) is calculated for each 1 Hz;

values of the dB/Hz at frequencies from 1 Hz to 20,000 Hz are normalized to have a maximum value of 100 and a minimum value of 0; the normalized values of dB/Hz are adopted as rated sound pressures P; the frequencies from 1 Hz to 20,000 Hz are divided into ten segments of 2,000 Hz each, and integrated values of the rated sound pressures P of each segment are calculated; when an integrated value of the rated sound pressures P for frequencies of 1 Hz or more to less than 2,000 Hz that is a first segment is represented by $P_1$, and an integrated value of the rated sound pressures P for frequencies of 18,000 Hz or more to 20,000 Hz or less that is a tenth segment is represented by $P_{10}$, $P_1/P_{10}$ exhibits a value of 1.25 or more; and <Condition 1-2> when a standard deviation σ of the integrated values of the rated sound pressures P of the ten segments is calculated, σ exhibits a value of 13,500 or less.

From the viewpoint of further suppressing an unpleasant feeling caused by sound during writing, it is preferred that the surface of the writing sheet of the present invention satisfies any one or more conditions selected from the following conditions 1-3 to 1-5.

<Condition 1-3>

Among the aforementioned ten segments, a rated sound pressure of an $n^{th}$ segment is represented by "$P_n$". The number of segments for which $P_n/P_{10}$ is less than 1.0 is not more than two segments.

<Condition 1-4>

When the integrated value of the rated sound pressure P of the first segment is represented by "$P_1$", and the integrated value of the rated sound pressure P of the second segment is represented by "$P_2$", $P_2/P_1$ exhibits a value of 0.95 or less.

<Condition 1-5>

When the integrated value of the rated sound pressure P of the second segment is represented by "$P_2$", and the integrated value of the rated sound pressure P of the third segment is represented by "$P_3$", $P_3/P_2$ exhibits a value of 0.80 or more.

The suitable ranges of the conditions 1-1 to 1-5 for the writing sheet of the present invention are the same as those of the conditions 1-1 to 1-5 for the aforementioned method for selecting a writing sheet for a touch panel pen.

In order to easily satisfy the conditions 1-1 to 1-5, it is preferred to use the writing sheet of the present invention as a writing sheet for a touch panel pen for which the number of independently mobile long materials is not more than 200 in a cross-sectional photograph of the nib. The explanation regarding independently mobile long materials is as described above.

It is also preferred to use the writing sheet of the present invention as a writing sheet for a touch panel pen having a nib diameter in the range mentioned above.

It is preferred that the writing sheet of the present invention satisfies the following condition 3-1:

<Condition 3-1> the haze defined in JIS K7136: 2000 for the writing sheet is 25.0% or more.

It is also preferred that the writing sheet of the present invention satisfies the following condition 3-2:

<Condition 3-2>

The total light transmittance defined in JIS K7361-1: 1997 is 87.0% or more.

The suitable ranges of the conditions 3-1 and 3-2 for the writing sheet of the present invention are the same as those of the conditions 3-1 and 3-2 for the aforementioned method for selecting a writing sheet for a touch panel pen.

<Overall Configuration of Writing Sheet>

The writing sheet for a touch panel pen of the present invention is not particularly limited by its configuration as long as at least one of the surfaces satisfies the conditions 1-1 and 1-2.

Examples of the configuration of the writing sheet 10 for a touch panel pen of the present invention include, as shown in FIGS. 1 and 2, a configuration having resin layer 2 on base material 1, wherein one of the surfaces of the resin layer 2 satisfies the conditions 1-1 and 1-2. The resin layer 2 may have a multilayer structure of first resin layer 2a and second resin layer 2b, as shown in FIG. 2.

Although not shown, the writing sheet 10 for a touch panel pen of the present invention may be configured to have a single resin layer without the base material or to have an additional layer other than the base material and the resin layer, and a surface of the additional layer may satisfy the conditions 1-1 and 1-2. Examples of the additional layer include antistatic layers, antifouling layers, antireflection layers, low-reflection layers and easy sliding layers.

The writing surface can be formed by "physical or chemical treatment such as embossing, sandblasting, or etching", "molding using a mold", "coating", etc. Among these methods, "molding using a mold" is suitable from the viewpoint of the reproducibility of the surface shape, and "coating" is suitable from the viewpoint of productivity and response to multi-itemed production.

From the viewpoint of imparting a writing feel and the viewpoint of suppressing a decrease in the resolution of a display component, it is preferred that the writing surface satisfies the following condition 2-1:

<Condition 2-1> arithmetic average roughness Ra defined in JIS B0601: 2001 with a cutoff value of 0.8 mm of the surface is 0.25 μm or more and 0.60 μm or less.

When the Ra of the surface of the writing sheet is made 0.25 μm or more, although a writing feel can be easily imparted, on the other hand it is easy for a sound that causes an unpleasant feeling to arise. For satisfying the condition 2-1 and easily satisfying the conditions 1-1 and 1-2 by the writing sheet, it is preferred that the writing surface of the writing sheet should satisfy physical properties (a) to (e) given below.

Cutoff value for calculating aforementioned Rt, and $\theta a$ and $\lambda a$ mentioned later is 0.8 mm. Considering that the diameter of the expected nib is preferably 0.3 to 2.5 mm, more preferably 0.5 to 2.0 mm, further preferably 0.7 to 1.7 mm, the cutoff value is selected as cutoff value which is within the expected range of the diameter, from among cutoff values defined by JIS.

(a) Maximum profile height Rt of a roughness curve of the writing surface defined in JIS B0601: 2001 is 2.5 μm or more and 8.0 μm or less.

(b) Average tilt angle $\theta a$ of the writing surface is 2.0 degrees or more and 7.5 degrees or less.

(c) Average wavelength $\lambda a$ calculated according to the expression $[\lambda a = 2\pi \times (Ra/\tan(\theta a))]$ from the average tilt angle $\theta a$ and arithmetic average roughness Ra defined in JIS B0601: 2001 is 30 μm or more and 150 μm or less.

(d) The area ratio of particles of the writing surface is 10.0% or more and 35.0% or less.

(e) The quotient of the $\lambda a$ (μM) and the particle density of the writing surface of 100 μm square (the number of particles/100 μm square) $[\lambda a(\mu m)/\text{Particle density (the number of particles/100 μm square)}]$ is 30 or more and 400 or less.

The physical properties (a) to (e) mean that: the asperities of the writing surface include asperities having a moderate size without having a large number of exceedingly high peaks and exceedingly low valleys; and the convex parts of the writing surface are moderately densely packed. By the writing surface satisfying the physical properties (a) to (e), effects such as "the generation of sounds of various frequencies is suppressed, and conditions 1-1 and 1-2 can be easily satisfied" and "the generation of excessive sound when writing can be suppressed" can be expected.

The satisfied physical properties (a) to (e) also lead to the favorable writing feeling and the suppression of the nib wear of a touch panel pen. The "writing feeling" means the sensations excluding sound among sensations perceived during writing, and examples thereof include whether or not there is a sufficient sensation of writing, and whether or not a heavy feeling cannot be perceived while writing.

Rt as the physical property (a) is more preferably 2.8 μm in or more and 6.0 μm in or less, further preferably 3.0 μm in or more and 4.5 μm in or less.

$\theta a$ as the physical property (b) is more preferably 3.0 degrees or more and 7.0 degrees or less, more preferably 3.5 degrees or more and 6.5 degrees or less.

λa as the physical property (c) is more preferably 35 μm in or more and 100 μm in or less, further preferably 50 μm in or more and 80 μm in or less.

The area ratio as the physical property (d) is more preferably 15.0% or more and 32.0% or less, further preferably 20.0% or more and 30.0% or less.

The quotient as the physical property (e) is more preferably 35 or more and 200 or less, further preferably 40 or more and 100 or less, and further preferably 40 or more and 70 or less.

Among the physical properties (a) to (e), in a case where λa as the physical property (c) is small, if the haze is of the same level, scintillation tends to be easily suppressible. Similarly, in a case where the area ratio as the physical property (d) is large, and also in a case where the quotient as the physical property (e) is small, if the haze is of the same level, scintillation tends to be easily suppressible.

The "average tilt angle θa" from which λa as the physical property (c) is calculated is a value defined in the manual (revised on 1995.07.20) of a surface roughness tester (trade name: SE-3400) manufactured by Kosaka Laboratory Ltd. and can be determined according to an arc tangent of the sum of projection heights $(h_1+h_2+h_3+ \ldots +h_n)$ present at reference length L, i.e., $\theta a = \tan^{-1}\{(h_1+h_2+h_3+ \ldots +h_n)/L\}$, as shown in FIG. 7. The number of n is 1500. That is, "$(h_1+h_2+h_3+ \ldots +h_n)$" corresponds to the sum of the projection heights of each segment obtained by dividing the reference length into 1500 segments.

The area ratio of particles as the physical property (d) can be calculated by binarizing an image using image analysis software from a planar photograph of the writing surface taken under an optical microscope or scanning electron microscope (SEM) or the like, and selecting particle parts. The particle density of the writing surface of 100 μm square (the number of particles/100 μm square) from which the physical property (e) is calculated can be calculated by counting the number of regions with independent particle parts in the image binarized as mentioned above. When performing these operations, it is preferred not to regard those materials for which the size of an independent region is less than 1 μm as particles. Examples of the image analysis software include image analysis software (name: Image J) that is in the public domain, and WinRooF (trade name) manufactured by Mitani Corp.

For the writing sheet of the present invention, the pencil hardness of the writing surface defined in JIS K5600-5-4: 1999 is preferably 2H or more and 9H or less, more preferably 5H or more and 7H or less, further preferably 5H or more and 6H or less, from the viewpoint of suppressing the wear of a touch panel pen while improving the scratch resistance of the writing surface.

The formation of the resin layer by the coating can be performed by applying a resin layer-forming application liquid containing a resin component, particles and a solvent onto the base material by an application method known in the art such as gravure coating or bar coating, followed by drying and curing. For easily satisfying the conditions 1-1 and 1-2 by the resin layer formed by the coating, it is preferred to set the average particle size of the particles, the content of the particles, and the thickness of the resin layer, etc. to ranges mentioned later.

When the resin layer is constituted by two or more layers as shown in FIG. 2, at least any of the resin layers may contain the particles. It is preferred that an uppermost-surface resin layer should contain the particles, from the viewpoint of easily satisfying the conditions 1-1 and 1-2. Alternatively, the uppermost-surface resin layer may contain the particles while lower resin layer(s) may contain no particles. This configuration can easily improve the pencil hardness of the writing surface.

Any of organic particles and inorganic particles can be used as the particles of the resin layer. Examples of the organic particles include particles consisting of polymethyl methacrylate, polyacryl-styrene copolymers, melamine resin, polycarbonate, polystyrene, polyvinyl chloride, benzoguanamine-melamine-formaldehyde condensates, silicone, fluorine resin and polyester resin. Examples of the inorganic particles include particles consisting of silica, alumina, antimony, zirconia and titania. Among these particles, organic particles are suitable from the viewpoint of easily suppressing the aggregation of the particles and easily satisfying the conditions 1-1 and 1-2.

The particles are preferably spherical particles from the viewpoint of the suppression of nib wear of a touch panel pen.

The average particle size of the particles in the resin layer differs depending on the thickness of the resin layer and therefore, cannot be generalized. The average particle size of the particles is preferably 1.0 to 10.0 μm, more preferably 2.0 to 5.0 μm, further preferably 2.5 to 3.5 μm, from the viewpoint of easily satisfying the conditions 1-1 and 1-2. For aggregated particles, it is preferred that the average particle size of the aggregated particles should satisfy the range described above.

The average particle size of the particles can be calculated by the following procedures (y1) to (y3).

(y1) a transmission observation image of the writing sheet of the present invention is taken under an optical microscope at a magnification of preferably ×500 to ×2000;

(y2) arbitrary 10 particles are extracted from the observation image, and the particle size of the individual particles are calculated, wherein the particle size is measured as a distance between arbitrary two straight lines combined so as to attain the largest distance between the two straight lines when the cross section of the particle is sandwiched between the two straight lines parallel to each other; and (y3) the same operation as above is performed as to five observation images taken in different fields of view of the same sample, and a number-average particle size from a total of 50 particles is used as the average particle size of the particles in the resin layer.

The particles may have a wide particle size distribution (a wide particle size distribution of single particles or a wide particle size distribution of mixed particles from two or more types of particles differing in particle size distribution). A narrower particle size distribution is more preferred from the viewpoint of suppressing scintillation. Specifically, the coefficient of variation of the particle size distribution of the particles is preferably 25% or less, more preferably 20% or less, further preferably 15% or less.

The content of the particles in the resin layer is preferably 12 to 38 parts by mass, more preferably 15 to 35 parts by mass, further preferably 18 to 30 parts by mass, with respect to 100 parts by mass of the resin component from the viewpoint of easily satisfying the conditions 1-1 and 1-2.

The suitable range of the film thickness of the resin layer differs slightly depending on an embodiment of the resin layer. For example, the thickness of the resin layer containing the particles is preferably 2.0 to 8.0 μm, more preferably 2.2 to 6.0 μm, further preferably 2.7 to 4.0 μm, from the viewpoint of easily satisfying the conditions 1-1 and 1-2, from the viewpoint of improving the pencil hardness of the writing surface, and from the viewpoint of suppressing curl.

The ratio of [the average particle size of the particles]/[the film thickness of the resin layer containing the particles] is preferably 0.7 to 1.3, more preferably 0.8 to 1.2, further preferably 0.9 to 1.1, from the viewpoint of easily satisfying the conditions 1-1and 1-2.

It is preferred that a resin layer containing no particles should be positioned nearer the base material than the resin layer containing the particles. Its thickness is preferably 3.0 to 15.0 μm, more preferably 6.0 to 10.0 μm, from the viewpoint of improving the pencil hardness of the writing surface and from the viewpoint of suppressing curl.

The film thickness of the resin layer can be calculated, for example, from an average value of thicknesses at 20 locations measured from a cross-sectional image taken using a scanning transmission electron microscope (STEM). The accelerating voltage of STEM is preferably 10 kV to 30 kV, and the magnification of STEM is preferably ×1000 to ×7000.

The resin component of the resin layer preferably contains a cured product of a thermosetting resin composition or an ionizing radiation-curable resin composition and more preferably contains a cured product of an ionizing radiation-curable resin composition, further preferably a cured product of an ultraviolet-curable resin composition, from the viewpoint of improving the pencil hardness of the writing surface.

The thermosetting resin composition is a composition containing at least a thermosetting resin and is a resin composition that is cured by heating.

Examples of the thermosetting resin include acrylic resin, urethane resin, phenol resin, urea melamine resin, epoxy resin, unsaturated polyester resin, and silicone resin. The thermosetting resin composition is supplemented with a curing agent, if necessary, in addition to the curable resin.

The ionizing radiation-curable resin composition is a composition containing a compound having an ionizing radiation-curable functional group (hereinafter, also referred to as an "ionizing radiation-curable compound"). Examples of the ionizing radiation-curable functional group include: ethylenic unsaturated bond groups such as (meth)acryloyl group, a vinyl group, and an allyl group; and an epoxy group and an oxetanyl group. The ionizing radiation-curable compound is preferably a compound having an ethylenic unsaturated bond group, more preferably a compound having two or more ethylenic unsaturated bond groups, further preferably a polyfunctional (meth)acrylate compound having two or more ethylenic unsaturated bond groups. Any of monomers and oligomers can be used as the polyfunctional (meth)acrylate compound.

The ionizing radiation means an electromagnetic wave or a charged particle radiation having the quantum of energy capable of polymerizing or cross-linking molecules. Usually, ultraviolet ray (UV) or electron beam (EB) is used. Alternatively, an electromagnetic wave such as X-ray or γ-ray or a charged particle radiation such as α-ray or ion beam may be used.

Among the polyfunctional (meth)acrylate compounds, examples of the difunctional (meth)acrylate monomer include ethylene glycol di(meth)acrylate, bisphenol A tetraethoxy diacrylate, bisphenol A tetrapropoxy diacrylate, 1,6-hexanediol diacrylate, dicyclopentenyl di(meth)acrylate, triethylene glycol diacrylate, tetraethylene glycol di(meth)acrylate, tricyclodecanediyl dimethylene di(meth)acrylate, and tris(2-hydroxyethyl) isocyanurate di(meth)acrylate.

Examples of the trifunctional or higher (meth)acrylate monomer include trimethylolpropane tri(meth)acrylate, trimethylolethane tri(meth)acrylate, pentaerythritol tri(meth)acrylate, pentaerythritol tetra(meth)acrylate, pentaerythritol hexa(meth)acrylate, ditrimethylolpropane tetra(meth)acrylate, dipentaerythritol hexa(meth)acrylate, dipentaerythritol penta (meth)acrylate, dipentaerythritol tetra(meth)acrylate, ditrimethylolpropane tetra(meth)acrylate, and tris(2-hydroxyethyl)isocyanurate tri(meth)acrylate.

The (meth)acrylate monomer may have a partially modified molecular skeleton. The (meth)acrylate monomer used can be modified with ethylene oxide, propylene oxide, caprolactone, isocyanuric acid, alkyl, cyclic alkyl, an aromatic compound, bisphenol, or the like.

Examples of the polyfunctional (meth)acrylate oligomer include acrylate polymers such as urethane (meth)acrylate, epoxy (meth)acrylate, polyester (meth)acrylate, and polyether (meth)acrylate.

The urethane (meth)acrylate is obtained, for example, through the reaction of a polyhydric alcohol and organic diisocyanate with hydroxy (meth)acrylate.

The epoxy (meth)acrylate is preferably (meth)acrylate obtained by reacting trifunctional or higher aromatic epoxy resin, alicyclic epoxy resin, aliphatic epoxy resin, or the like with (meth)acrylic acid, (meth)acrylate obtained by reacting difunctional or higher aromatic epoxy resin, alicyclic epoxy resin, aliphatic epoxy resin, or the like with polybasic acid and (meth)acrylic acid, or (meth)acrylate obtained by reacting difunctional or higher aromatic epoxy resin, alicyclic epoxy resin, aliphatic epoxy resin, or the like with a phenol and (meth)acrylic acid.

These ionizing radiation-curable compounds can be used alone or in combination of two or more.

When the ionizing radiation-curable compound is an ultraviolet-curable compound, the ionizing radiation-curable composition preferably contains an additive such as a photopolymerization initiator or a photopolymerization accelerator.

The photopolymerization initiator is one or more members selected from the group consisting of acetophenone, benzophenone, α-hydroxyalkylphenone, Michler's ketone, benzoin, benzyl dimethyl ketal, benzoyl benzoate, α-acyloxime ester, thioxanthones, and the like.

The melting point of the photopolymerization initiator is preferably 100° C. or higher. When the melting point of the photopolymerization initiator is 100° C. or higher, a residual photopolymerization initiator is sublimated in the course of production of the writing sheet or in the course of formation of a transparent conductive film of a touch panel. Thus, the contamination of the production apparatus or the transparent conductive film can be prevented.

The photopolymerization accelerator can reduce the inhibition of polymerization by air during curing and accelerate a curing rate. The photopolymerization accelerator is, for example, one or more members selected from the group consisting of p-dimethylaminobenzoic acid isoamyl ester, p-dimethylaminobenzoic acid ethyl ester, and the like.

In the resin layer-forming application liquid, a solvent is usually used for adjusting a viscosity or for allowing each component to be dissolved or dispersed. The surface state of the resin layer after application and drying differs depending on the type of the solvent. Therefore, it is preferred to select the solvent in consideration of the saturated vapor pressure of the solvent, the permeability of the solvent into a transparent base material, etc. Specifically, examples of the solvent can include ketones (acetone, methyl ethyl ketone, methyl isobutyl ketone, cyclohexanone, etc.), ethers (dioxane, tetrahydrofuran, etc.), aliphatic hydrocarbons (hexane, etc.), alicyclic hydrocarbons (cyclohexane, etc.), aromatic hydrocarbons (toluene, xylene, etc.), halocarbons (dichloromethane, dichloroethane, etc.), esters (methyl acetate, ethyl acetate, butyl acetate, etc.), alcohols (butanol, cyclohexanol, etc.), cellosolves (methylcellosolve, ethylcellosolve, etc.), cellosolve acetates, sulfoxides (dimethyl sulfoxide, etc.), and amides (dimethylformamide, dimethylacetamide, etc.). A mixture thereof may be used.

When the drying of the solvent is too slow, it is difficult to form a surface shape that easily satisfies the conditions 1-1 and 1-2 due to excessive leveling properties of the resin layer. Thus, for the solvent, it is preferred that a solvent having an evaporation rate (relative evaporation rate to the evaporation rate of n-butyl acetate defined as 100) of 180 or more should be contained at 50% by mass or more, more preferably 60% by mass or more, in all solvents. Examples of the solvent having a relative evaporation rate of 180 or more include toluene. The relative evaporation rate of toluene is 195.

It is preferred that the resin layer-forming application liquid should contain a leveling agent, from the viewpoint of rendering the surface shape moderately smooth and easily adjusting the surface shape of the writing sheet to the range mentioned above. Examples of the leveling agent include fluorine leveling agents, silicone leveling agents, and fluorine-silicone copolymer leveling agents. The amount of the leveling agent added is preferably 0.01 to 0.50% by weight, more preferably 0.10 to 0.40% by weight, further preferably 0.20 to 0.30% by mass, with respect to the total solid content of the resin layer-forming application liquid.

A plastic film is suitable as the base material.

The plastic film can be formed from a resin such as polyester, triacetylcellulose (TAC), cellulose diacetate, cellulose acetate butyrate, polyamide, polyimide, polyethersulfone, polysulfone, polypropylene, polymethylpentene, polyvinyl chloride, polyvinyl acetal, polyether ketone, polymethyl methacrylate, polycarbonate, polyurethane and cyclo-olefin-polymer (COP).

Among these plastic films, a polyester film processed by orienting, particularly, biaxial orienting, is preferred from the viewpoint of mechanical strength and dimensional stability and from the viewpoint of easily satisfying the physical property (f). The polyester film is preferably polyethylene terephthalate or polyethylene naphthalate.

The thickness of the base material is preferably 5 to 200 μm, more preferably 10 to 150 μm.

[Touch Panel]

The touch panel of the present invention is a touch panel comprising a sheet on a surface, wherein the writing sheet for a touch panel pen of the present invention is placed as the sheet such that the side that satisfies the conditions 1-1 and 1-2 faces the surface of the touch panel.

Examples of the touch panel include resistive touch panels, capacitive touch panels, in-cell touch panels, optical touch panels, ultrasonic touch panels and electromagnetic touch panels.

Resistive touch panel 100, as shown in FIG. 8, is prepared by connecting a circuit (not shown) to a basic configuration in which a pair of transparent substrates 20 (upper and lower transparent substrates) having conductive films 30 are placed via spacer 40 such that the conductive films 30 face each other.

Examples of the resistive touch panel include the writing sheet 10 of the present invention used as the upper transparent substrate 20 such that the side that satisfies the conditions 1-1 and 1-2 in the writing sheet 10 faces the surface of the touch panel 100. Although not shown, the resistive touch panel may have a configuration in which the writing sheet of the present invention is laminated on the upper transparent substrate such that the side that satisfies the conditions 1-1 and 1-2 faces the surface, or a configuration in which the writing sheet of the present invention is placed on the upper transparent substrate such that the side that satisfies the conditions 1-1 and 1-2 faces the surface, and the writing sheet is fixed using a frame or the like.

Examples of the capacitive touch panel include surface capacitive touch panels and projected capacitive touch panels. Projected capacitive touch panels are often used. The projected capacitive touch panel is prepared by connecting a circuit to a basic configuration in which an X-axis electrode and a Y-axis electrode that intersects the X-axis electrode are placed via an insulator. More specifically, examples of the basic configuration include a form in which the X-axis electrode and the Y-axis electrode are formed on separate sides of one transparent substrate, a form in which the X-axis electrode, the insulator layer, and the Y-axis electrode are formed in this order on one transparent substrate, and a form as shown in FIG. 9 in which: X-axis electrode 50 is formed on transparent substrate 20; Y-axis electrode 60 is formed on another transparent substrate 20; and these are laminated via insulator layer 70 such as an adhesive layer. Another example thereof includes a form in which an additional transparent substrate is further laminated on any of these basic forms.

Examples of the configuration of the capacitive touch panel include a configuration in which the writing sheet 10 of the present invention is used as the transparent substrate 20 on the surface side such that the side that satisfies the conditions 1-1 and 1-2 in the writing sheet 10 faces the surface of the touch panel 100. Although not shown, the capacitive touch panel may have a configuration in which the writing sheet of the present invention is laminated on the transparent substrate on the surface side such that the side that satisfies the conditions 1-1 and 1-2 faces the surface, or a configuration in which the writing sheet of the present invention is placed on the transparent substrate on the surface side such that the side that satisfies the conditions 1-1 and 1-2 faces the surface, and the writing sheet is fixed using a frame or the like.

The electromagnetic touch panel is a touch panel that employs a dedicated pen generating a magnetic field. The electromagnetic touch panel has at least a sensor unit which detects electromagnetic energy generated from the pen and further has a transparent substrate on the sensor unit. The transparent substrate may have a multilayer structure.

Examples of the configuration of the electromagnetic touch panel include a configuration in which the writing sheet of the present invention is used as an uppermost-surface transparent substrate among the transparent substrates positioned on the sensor unit such that the side that satisfies the conditions 1-1 and 1-2 in the writing sheet faces the surface of the touch panel. Alternatively, the electromagnetic touch panel may have a configuration in which the writing sheet of the present invention is laminated on the uppermost-surface transparent substrate among the transparent substrates positioned on the sensor unit such that the side that satisfies the conditions 1-1 and 1-2 faces the surface, or a configuration in which the writing sheet of the present invention is placed on the uppermost-surface transparent substrate such that the side that satisfies the conditions 1-1 and 1-2 faces the surface, and the writing sheet is fixed using a frame or the like.

The in-cell touch panel has, for example, resistive, capacitive, or optical touch panel functions incorporated inside a liquid-crystal component prepared by sandwiching liquid crystals between two glass substrates.

The in-cell touch panel includes the writing sheet of the present invention placed on the glass substrate on the surface side such that the side that satisfies the conditions 1-1 and 1-2 faces the surface of the touch panel. The in-cell touch panel may have an additional layer such as a polarizer between the glass substrate on the surface side and the writing sheet of the present invention.

[Touch Panel System]

The touch panel system of the present invention is a touch panel system comprising: a touch panel comprising a writing sheet for a touch panel pen on a surface; and a touch panel pen, wherein the touch panel system satisfies the following conditions 1-1 and 1-2:

<Condition 1-1> a sound that arises when the touch panel pen is brought into contact with a surface of the writing sheet for a touch panel pen at an acute angle of 25 to 35 degrees and, while maintaining the angle, a vertical load of 45 to 55 gf is applied to the touch panel pen and the touch panel pen is reciprocatingly moved 45 to 55 mm in one-way length at a rate of 180 to 220 mm/sec is recorded;

when recording, the sound is converted from an analog signal to a digital signal at a sampling frequency of 44.1 kHz and recorded; a soundless portion is added to before and after the sound converted into a digital signal so that an overall time period of the digital signal becomes 0.7 seconds; the digital signal to which the soundless portion has been added is subjected to fast Fourier transform in which a range of variables is 1 Hz to 22,000 Hz and the Hanning window is adopted as a window function, and a sound pressure (dB/Hz) is calculated for each 1 Hz;

values of the dB/Hz at frequencies from 1 Hz to 20,000 Hz are normalized to have a maximum value of 100 and a minimum value of 0; the normalized values of dB/Hz are adopted as rated sound pressures P; the frequencies from 1 Hz to 20,000 Hz are divided into ten segments of 2,000 Hz each, and integrated values of the rated sound pressures P of each segment are calculated; when an integrated value of the rated sound pressures P for frequencies of 1 Hz or more to less than 2,000 Hz that is a first segment is represented by $P_1$, and an integrated value of the rated sound pressures P for frequencies of 18,000 Hz or more to 20,000 Hz or less that is a tenth segment is represented by $P_{10}$, $P_1/P_{10}$ exhibits a value of 1.25 or more; and <Condition 1-2> when a standard deviation σ of the integrated values of the rated sound pressures P of the ten segments is calculated, σ exhibits a value of 13,500 or less.

In the touch panel system of the present invention, examples of the embodiments of the touch panel, the writing sheet for a touch panel pen, and the touch panel pen include the same as the embodiments shown in the aforementioned method for selecting a writing sheet for a touch panel pen, writing sheet for a touch panel pen, and touch panel according to the present invention.

The touch panel system of the present invention can impart a high level of writing feeling to the touch panel.

[Display Device with Touch Panel]

The display device with a touch panel of the present invention is a display device comprising the touch panel on a display component, wherein the touch panel is the touch panel of the present invention.

Examples of the display component include liquid-crystal display components, EL display components, plasma display components, and electronic paper components. When the display component is a liquid-crystal display component, an EL display component, a plasma display component, or an electronic paper component, the touch panel of the present invention is placed on this display component.

The display device with a touch panel of the present invention can provide a high level of writing feeling.

EXAMPLES

Next, the present invention will be described in more detail with reference to Examples. However, the present invention is not limited by these examples by any means.

1. Measurement and Evaluation

A writing sheet for a touch panel pen prepared or provided in each of Examples was measured and evaluated as described below.

1-1. Recording of Sound

A writing sheet for a touch panel pen prepared or provided in each of Experimental Examples was cut into pieces that each had a size of 10 cm×10 cm. The cutting locations were selected from random sites after visual confirmation that abnormalities such as waste or flaws were absent under illumination with a fluorescent lamp. The writing sheet for a touch panel pen that had been cut was laminated via an acrylic pressure-sensitive adhesive layer having a thickness of 25 μm onto a resin plate made of polymethacrylate (manufactured by Kuraray Co., Ltd., trade name: COMOGLAS, model number: DFA502K) having a thickness of 2.0 mm, and 10 samples having a size of 10 cm×10 cm were prepared. The samples were left in a measurement atmosphere involving a temperature of 23° C.±5° C. and a humidity of 50%±10% for 10 minutes to acclimatize the samples to the measurement atmosphere.

As illustrated in FIG. 5, a sample 90 was horizontally disposed and fixed on the electronic balance 81. Next, touch panel pens 1 to 4 described hereunder were brought into contact with the surface on the writing sheet for a touch panel pen side of the sample at an acute angle within a range of 25 to 35 degrees. Next, while maintaining the aforementioned angle and also maintaining a value of the electronic balance within a range of 45 to 55 g, the touch panel pen was reciprocatingly moved 45 to 55 mm in one-way length at a rate of 180 to 220 mm/sec, and a sound that was generated at such time was recorded. The direction in which the touch panel pen was reciprocatingly moved was a direction parallel to orientation of the axis of the touch panel pen. In Table 1, for each of the touch panel pens, the values for "average angle", "average load", "rate", "moving distance on outward route" and "moving distance on return route" when writing on the respective writing sheets for a touch panel pen are shown. The average angle and the average load are average values of the angle and load for each 0.1 second of a moving image captured when writing. The rate is a value that is calculated by dividing the combined outward and return moving distance by the writing time period.

Recording was performed using the recording function of a smartphone (manufactured by Sharp Corp., trade name: SH-03G), and the sampling frequency when converting an analog signal to a digital signal was 44.1 kHz and the amount of voltage fluctuation was represented by 16 bits. The smartphone was disposed at a distance of 1 cm from the left edge of the sample, and the height of the writing surface and the height of the smartphone were made the same. Further, the smartphone was disposed so that a microphone portion thereof faced toward the upper side.

Next, in accordance with the description of the aforementioned condition 1-1, the sound pressure (dB/Hz) was calculated for each 1 Hz by fast Fourier transform or the like, and the values of the dB/Hz in the range of frequencies from 1 Hz to 20,000 Hz were normalized to have a maximum value of 100 and a minimum value of 0. The normalized sound pressure for each unit frequency was taken as the rated sound pressure P, and the parameters of the condition 1-1 to condition 1-5 were calculated. The average value for the ten samples was adopted as the parameter for each of the Experimental Examples. The results are shown in Table 2.

FIGS. 10 to 13 are diagrams showing graphs in which the ordinate depicts integrated values of the rated sound pressures P of respective segments calculated in accordance with the condition 1-1, and the abscissa depicts a first segment to a tenth segment with respect a time of using the writings sheets for a touch panel pen of Experimental Examples 1 to 4 as the writing sheet for a touch panel pen, and using touch panel pens 1 to 4 that are described hereunder as the touch panel pen.

<Touch Panel Pen 1>
Pen that uses a replacement felt tip (DPTA-PTF1) for a stylus pen for digital paper (trade name: DPT-S1) manufactured by Sony Corp.
Number of independently mobile long materials (fibers) in a cross-sectional photograph of the nib: 930
Nib diameter: 1.5 mm <Touch Panel Pen 2>
Touch panel pen attached to trade name "Surface Pro 4" manufactured by Microsoft Corp. (nib HB)
Number of independently mobile long materials in a cross-sectional photograph of the nib: 0
Nib diameter: 1.6 mm <Touch Panel Pen 3>
Touch panel pen attached to trade name "iPad Pro" manufactured by Apple Inc. Number of independently mobile long materials (fibers) in a cross-sectional photograph of the nib: 0
Nib diameter: 2.0 mm <Touch Panel Pen 4>
Touch panel pen attached to trade name "Dynabook Tab S68" manufactured by Toshiba Corp.
Number of independently mobile long materials (fibers) in a cross-sectional photograph of the nib: 1520
Nib diameter: 1.5 mm The number of independently mobile long materials (fibers) in a cross-sectional photograph of the nib of each of the touch panel pens 1 and 4 was calculated by binarizing from the digital data of an SEM photograph taken under a magnification of ×200 using image analysis software (trade name: WinRooF, manufactured by Mitani Corp.), and counting the number of black parts whose entire circumference was surrounded by white.

1-2. Unpleasant Feeling of Sound

The sounds recorded in the aforementioned 1-1 were played back to 20 people as subjects, and the subjects evaluated unpleasant feelings of the sounds. When conducting the evaluation, in order to reduce the influence of sound pressure, the maximum sound pressures of the sounds were made approximately the same. Further, to reduce the influence of the sound that was listened to immediately prior to listening to the current sound, an interval of one minute was provided between the respective sounds. Each subject gave two points to a sound which the subject did not feel was unpleasant, one point to a sound with respect to which the subject was unable to say whether or not the sound felt unpleasant, and zero points to a sound which the subject felt was unpleasant, and the average score for the 20 people was then calculated. A sound with an average score of 1.8 points or higher for the 20 people was given AA; a sound with an average score of 1.6 or higher and lower than 1.8 points was given A; a sound with an average score of 1.0 or higher and lower than 1.6 points was given B; and a sound with an average score of lower than 1.0 point was given C. The results are shown in Table 2.

1-3. Surface Shape Measurement

The writing sheets prepared or provided in each of Experimental Examples were cut into 10-cm square pieces. The cutting locations were selected from random sites after visual confirmation that abnormalities such as waste or flaws were absent under illumination with a fluorescent lamp. The cut writing sheet was laminated onto a black plate (manufactured by Kuraray Co., Ltd., trade name: COMOGLAS, model number: DFA502K, thickness: 2.0 mm) having a size of 10 cm in length×10 cm in width via an optical transparent pressure-sensitive adhesive sheet (refractive index: 1.47, thickness: 100 μm) manufactured by Toray Industries, Inc. 10 such samples were provided for each example. The samples were left in a measurement atmosphere involving a temperature of 23° C.±5° C. and a humidity of 50%±10% for 10 minutes to acclimatize the samples to the measurement atmosphere.

The surface shape on the resin layer side of the writing sheet for a touch panel pen was measured with respect to measurement items described below under measurement conditions described below using a surface roughness tester (model number: SE-3400; manufactured by Kosaka Laboratory Ltd.). Average values from the 10 samples were used as Ra, Rt, θa and λa of each Experimental Example. The results are shown in Table 3.

<Measurement Conditions>
[Probe of surface roughness detection unit]
SE2555N (trade name) manufactured by Kosaka Laboratory Ltd. (radius of curvature of the tip: 2 μm, apex angle: 90 degrees, material: diamond)
[Measurement Conditions of Surface Roughness Tester]
Probe speed: 0.5 mm/s
Longitudinal magnification: ×2000
Lateral magnification: ×10
Evaluation length: cutoff value λc×5
Preliminary length: (cutoff value λc)×2
Skid: not used (no contact with measuring surface)
Cutoff filter type: Gaussian
Dead band level: 10%
tp/PC curve: normal
Sampling mode: c=1500
<Measurement Items>
Arithmetic average roughness Ra defined in JIS B0601: 2001 with a cutoff value of 0.8 mm
Maximum profile height Rt of a roughness curve defined in JIS B0601: 2001 with a cutoff value of 0.8 mm
Average tilt angle θa with a cutoff value of 0.8 mm
Average wavelength λa with a cutoff value of 0.8 mm 1-4. Area Ratio of Particles and Density of Particles
Photographing of Planar Photograph Using Optical Microscope An optical microscope photograph of the writing sheet surface was taken under the following photographing conditions using a digital microscope (model number: VHX5-00) manufactured by KEYENCE CORPORATION.

<Photographing Conditions>
Lens: ZS-200
Shutter speed: auto 93
Gain: manual 0.0 db
Epi-illumination: on
Stage transillumination: off Edge enhancement: on 7.0
Gamma: on −0.8
Offset: on 0.4
Monochrome: off
Vivid and sharp image mode: on
Field of view correction: off
<Captured Image>
Size: 1600×1200
Format: JPEG, each color of R, G, B, 256 gradations
(2) Calculation of Area Ratio and Particle Density The area ratio (%) and particle density (the number of particles/100 μm square) of the particles were calculated by the following steps (a) to (g) using public domain image analysis software (name: Image J, Version: 1.50i). The area ratio (%) and particle density (the number of particles/100 μm square) were calculated based on 10 photographs for each Experimental Example, and the average values thereof were adopted as the area ratio (%) and particle density (the number of particles/100 μm square) for the respective Experimental Examples. The results are shown in Table 3.
(a) Read in a JPEG file of the aforementioned (1).
(b) Enter the scale of the image in "Known distance" column.
(c) Adjust the brightness and contrast by performing the operation: "Image→Adjust→Brightness Contrast".
(d) Convert the image color tones into grayscale of 256 levels by performing the operation: "Image→Type 8-bit".
(e) Perform the operation "Image→Adjust→Threshold" to thereby select a filter which enables particle parts and resin parts to be distinguished from each other (in the present example, "Yen" was selected from among the filters). After selecting the filter, while viewing the image, select whether the matrix (resin) is to appear light or dark, and adjust the brightness threshold.
(f) Select a round area with a diameter of 300 μm at a center part of the image.
(g) Perform the operation "Analyze→Analyze Particle" to show the menu, and press "OK" after setting the following items (i) to (iv), to thereby measure the area ratio and particle density of the particles. With regard to the particle density, convert the particle density for the round area with a diameter of 300 μm to the particle density for a 100 μm square.
(i) If a spherical filler is included, check "Include Holes". If a spherical filler is not included, do not check "Include Holes".
(ii) Enter "1-Infinity" in the "Size" column (perform a setting that does not regard material with a size less than 1 μm as particles)
(iii) Remove the check from "Exclude on edge".
(iv) Check "Summarize".

1-5. Haze and Total Light Transmittance

The writing sheet for a touch panel prepared or provided in each of Examples was cut into 5 cm square. 10 such samples were provided for each example. The 10 sites were selected from random sites after visual confirmation that abnormalities such as waste or flaws were absent. The haze (JIS K-7136: 2000) and total light transmittance (JIS K7361-1: 1997) were measured using a haze meter (HM-150, manufactured by Murakami Color Research Laboratory Co., Ltd.). The surface of light incidence was set to the base material side. Average values from the 10 samples were used as the haze and the total light transmittance for each of the Experimental Examples. The results are shown in Table 3.

1-6. Writing Feeling (Feel)

The aforementioned touch panel pen 4 was used to write on the samples prepared in the aforementioned 1-1, and whether or not there was a sufficient feel of writing was evaluated as evaluation points. Twenty persons graded the samples such that: a sample that offered a sufficient feel of writing was given 2; a sample that offered a normal feel of writing was given 1; and a sample that offered an insufficient feel of writing was given 0. A sample with an average score of 1.6 or higher from the 20 persons was given A; a sample with an average score of 1.0 or higher and lower than 1.6 was given B; and a sample with an average score of less than 1.0 was given C. The results are shown in Table 3.

1-7. Writing Feeling (Weight)

The aforementioned touch panel pen 4 was used to write on the samples prepared in the aforementioned 1-1, and whether or not the writing felt heavy was evaluated as evaluation points. Twenty persons graded the samples such that: a sample for which writing did not feel heavy was given 2; a sample for which the person was unable to say whether or not the writing felt heavy was given 1; and a sample for which writing felt heavy was given 0. A sample with an average score of 1.6 or higher from the 20 persons was given A; a sample with an average score of 1.0 or higher and lower than 1.6 was given B; and a sample with an average score of less than 1.0 was given C. The results are shown in Table 3.

1-8. Scintillation

Each of the writing sheets for a touch panel pen of Experimental Examples 1 to 4 was placed on a commercially available ultra-high-resolution liquid-crystal display device (pixel density: 350 ppi), and the scintillation state was visually evaluated. Twenty persons graded the samples such that: a sample for which scintillation was of a level that could not be recognized by visual observation was given 2; a sample for which scintillation was slightly observed but was of a level that could be ignored was given 1; and a sample for which scintillation was observed to a severe degree was given 0. A sample with an average score of 1.8 or higher from the 20 persons was given A; a sample with an average score of 1.6 or higher and lower than 1.8 was given B; a sample with an average score of 1.0 or higher and lower than 1.6 was given C; and a sample with an average score of less than 1.0 was given D. The results are shown in Table 3.

2. Preparation of Writing Sheet for Touch Panel Pen

Experimental Example 1

The base material used was a triacetylcellulose resin film (thickness: 80 μm, manufactured by Fujifilm Corporation, TD80UL). Resin layer application liquid 1 having the formulation described below was applied onto the base material such that the thickness after drying was 2.5 μm. A resin layer was formed by drying and ultraviolet irradiation to obtain a writing sheet for a touch panel pen.

| <Resin layer application liquid 1> | |
|---|---|
| Pentaerythritol triacrylate (manufactured by Nippon Kayaku Co., Ltd.; KAYARAD-PET-30) | 100 parts |
| Inorganic particles (manufactured by Fuji Silysia Chemical Ltd., amorphous silica) (hydrophobized, silane coupler, average aggregated particle size: 2 μm) | 14 parts |

<Resin layer application liquid 1>

| | |
|---|---|
| Photopolymerization initiator (manufactured by BASF SE, Irgacure 184) | 5 parts |
| Silicone leveling agent (manufactured by Momentive Performance Materials Inc., TSF4460) | 0.2 parts |
| Mold release agent (manufactured by Daikin Industries, Ltd., trade name: OPTOOL DAC) | 2 parts |
| Solvent 1 (toluene) | 150 parts |
| Solvent 2 (methyl isobutyl ketone) | 35 parts |

Experimental Example 2

Commercially available touch panel surface films (manufactured by Sony Corp., trade name: Friction Sheet DPTA-OSF1) having a resin layer containing particles (particle size: approximately 7 to 13 μm) on a polyethylene terephthalate film were provided as writing sheets for a touch panel pen of Experimental Example 2.

Experimental Example 3

The base material used was a polyethylene terephthalate film (thickness: 100 μm, manufactured by Toyobo Co., Ltd., trade name: A4300). First resin layer application liquid 2 having the formulation described below was applied onto the base material such that the thickness after drying was 8 μm. A first resin layer was formed by drying and ultraviolet irradiation. Subsequently, second resin layer application liquid 3 having the formulation described below was applied onto the first resin layer such that the thickness after drying was 3 μm. A second resin layer was formed by drying and ultraviolet irradiation to obtain a writing sheet for a touch panel pen.

<First resin layer application liquid 2>

| | |
|---|---|
| Pentaerythritol triacrylate | 60 parts |
| Dipentaerythritol hexaacrylate | 40 parts |
| Photopolymerization initiator (manufactured by BASF SE, trade name: Irgacure 184) | 4 parts |
| Solvent 1 (methyl isobutyl ketone) | 90 parts |
| Solvent 2 (methyl ethyl ketone) | 10 parts |

<Second resin layer application liquid 3>

| | |
|---|---|
| Acrylic monomer | 62 parts |
| Organic particles (spherical polystyrene particles, average particle size: 3.0 μm) | 18 parts |
| Photopolymerization initiator (manufactured by BASF SE, Irgacure 184) | 5 parts |
| Fluorine leveling agent (manufactured by DIC Corp., Megafac RS-75) | 0.3 parts |
| Solvent 1 (toluene) | 157 parts |
| Solvent 2 (methyl isobutyl ketone) | 13 parts |

Experimental Example 4

The base material used was a triacetylcellulose resin film (thickness: 80 μm, manufactured by Fujifilm Corporation, TD80UL). Resin layer application liquid 4 having the formulation described below was applied onto the base material such that the thickness after drying was 2.5 μm. A resin layer was formed by drying and ultraviolet irradiation to obtain a writing sheet for a touch panel pen.

<Resin layer application liquid 4>

| | |
|---|---|
| Pentaerythritol triacrylate | 60 parts |
| Dipentaerythritol hexaacrylate | 40 parts |
| Organic particles (spherical polystyrene, average particle size: 9.0 μm) | 10 parts |
| Photopolymerization initiator (manufactured by BASF SE, Irgacure 184) | 3 parts |
| Fluorine-silicone copolymer leveling agent (manufactured by Shin-Etsu Chemical Co., Ltd., X-71-1203M) | 0.2 parts |
| Solvent 1 (toluene) | 20 parts |
| Solvent 2 (cyclohexanone) | 24 parts |
| Solvent 3 (methyl isobutyl ketone) | 156 parts |

TABLE 1

| | | Experimental Example 1 | Experimental Example 2 | Experimental Example 3 | Experimental Example 4 |
|---|---|---|---|---|---|
| Pen 1 | Average angle (degrees) | 34 | 25 | 31 | 25 |
| | Average load (gf) | 45 | 48 | 52 | 51 |
| | Rate (mm/sec) | 203 | 199 | 192 | 206 |
| | Outward route (mm) | 52 | 47 | 47 | 52 |
| | Return route (mm) | 55 | 46 | 55 | 46 |
| Pen 2 | Average angle (degrees) | 31 | 25 | 27 | 26 |
| | Average load (gf) | 55 | 47 | 45 | 46 |
| | Rate (mm/sec) | 184 | 199 | 200 | 202 |
| | Outward route (mm) | 54 | 55 | 45 | 46 |
| | Return route (mm) | 52 | 46 | 49 | 47 |
| Pen 3 | Average angle (degrees) | 26 | 31 | 32 | 30 |
| | Average load (gf) | 48 | 52 | 49 | 53 |
| | Rate (mm/sec) | 202 | 211 | 218 | 201 |
| | Outward route (mm) | 53 | 48 | 51 | 49 |
| | Return route (mm) | 51 | 54 | 51 | 49 |
| Pen 4 | Average angle (degrees) | 32 | 34 | 32 | 35 |
| | Average load (gf) | 45 | 48 | 55 | 46 |
| | Rate (mm/sec) | 206 | 205 | 199 | 210 |
| | Outward route (mm) | 53 | 47 | 52 | 52 |
| | Return route (mm) | 45 | 45 | 50 | 47 |

TABLE 2

| | | Experimental Example 1 | Experimental Example 2 | Experimental Example 3 | Experimental Example 4 |
|---|---|---|---|---|---|
| Pen 1 | Condition 1-1 | 0.94 | 1.13 | 1.00 | 1.04 |
| | Condition 1-2 | 7372 | 7698 | 6446 | 7092 |
| | Condition 1-3 | 8 | 3 | 7 | 5 |
| | Condition 1-4 | 0.97 | 0.94 | 0.85 | 0.99 |
| | Condition 1-5 | 0.93 | 0.96 | 1.01 | 0.97 |
| | Unpleasant feeling of sound | C | C | C | C |
| Pen 2 | Condition 1-1 | 1.33 | 1.45 | 1.38 | 1.56 |
| | Condition 1-2 | 11430 | 13589 | 11967 | 17218 |
| | Condition 1-3 | 2 | 2 | 2 | 3 |
| | Condition 1-4 | 0.91 | 0.96 | 0.83 | 0.93 |
| | Condition 1-5 | 0.93 | 0.92 | 0.93 | 0.93 |
| | Unpleasant feeling of sound | B | C | A | C |
| Pen 3 | Condition 1-1 | 1.55 | 1.64 | 1.42 | 1.50 |
| | Condition 1-2 | 11510 | 15283 | 9901 | 13887 |
| | Condition 1-3 | 0 | 0 | 1 | 0 |
| | Condition 1-4 | 0.95 | 0.96 | 0.86 | 1.04 |
| | Condition 1-5 | 0.83 | 0.81 | 0.88 | 0.81 |

TABLE 2-continued

|  |  | Experimental Example 1 | Experimental Example 2 | Experimental Example 3 | Experimental Example 4 |
|---|---|---|---|---|---|
|  | Unpleasant feeling of sound | A | C | AA | C |
| Pen 4 | Condition 1-1 | 1.30 | 1.30 | 1.14 | 1.28 |
|  | Condition 1-2 | 14108 | 15345 | 11102 | 14891 |
|  | Condition 1-3 | 2 | 2 | 5 | 2 |
|  | Condition 1-4 | 1.00 | 1.01 | 0.85 | 1.02 |
|  | Condition 1-5 | 0.99 | 0.96 | 0.99 | 0.92 |
|  | Unpleasant feeling of sound | C | C | C | C |

TABLE 3

|  |  | Experimental Example 1 | Experimental Example 2 | Experimental Example 3 | Experimental Example 4 |
|---|---|---|---|---|---|
|  | Ra (μm) | 0.4 | 1.2 | 0.4 | 2.1 |
|  | Rt (μm) | 5.8 | 11.2 | 3.9 | 15.2 |
|  | θa (degrees) | 3.9 | 4.2 | 6.1 | 8.3 |
|  | λa (μm) | 71 | 214 | 49 | 193 |
|  | Area ratio of particles (%) | 11.7 | 12.6 | 24.7 | 47.1 |
|  | Particle density of 100 μm square (the number of particles/100 μm square) | 0.43 | 0.06 | 0.94 | 0.31 |
|  | λa/particle density | 165 | 3567 | 52 | 623 |
|  | Haze (%) | 23.0 | 22.1 | 59 | 64 |
|  | Total light transmittance (%) | 90.8 | 89.4 | 89.5 | 88.0 |
| Writing feeling | Feel of writing | A | A | A | A |
|  | Weight of writing | B | C | A | C |
|  | Scintillation | D | D | A | C |

As shown in Table 2, a writing sheet that satisfied the conditions 1-1 and 1-2 was given B or higher in the evaluation of unpleasant feeling of sound. This indicates that the selection of a writing sheet that satisfies the conditions 1-1 and 1-2 leads to the selection of a writing sheet that can suppress unpleasant sounds during writing. Since the pens 1 to 4 all differ in type, the results of Table 2 indicate that even if any touch panel pen is used, the selection of a writing sheet that satisfies the conditions 1-1 and 1-2 leads to the selection of a writing sheet that can suppress unpleasant sounds during writing.

From the results of Table 2 and Table 3, it can also be confirmed that a combination of a touch panel pen (pen 1 and pen 3) in which the number of independently mobile long materials in a cross-sectional photograph of the nib is not more than 200, and a writing sheet (writing sheet of Experimental Example 1 and Experimental Example 3) having physical properties such as λa and λa/particle density in the suitable ranges described herein is a combination effective for suppressing unpleasant sounds during writing.

From the results of Table 3, it can also be confirmed that a writing sheet (writing sheet of Experimental Example 1 and Experimental Example 3) for which parameters relating to the surface shape, namely, Ra, Rt, θa, λa and λa/particle density, are each in the suitable ranges described herein is excellent in writing feeling.

Further, it can be confirmed that a writing sheet (writing sheet of Experimental Example 3) for which λa, the area ratio of particles, λa/particle density and haze are in the suitable ranges described herein is extremely excellent in suppression of scintillation.

3. Preparation of Touch Panel

A conductive film of ITO having a thickness of 20 nm was formed by the sputtering method on the base material side of the writing sheet for a touch panel pen of each of Examples 1 to 4 to prepare an upper electrode plate. Subsequently, a conductive film of ITO having a thickness of approximately 20 nm was formed by the sputtering method on one side of a reinforced glass plate having a thickness of 1 mm to prepare a lower electrode plate. Subsequently, an application liquid for spacers containing an ionizing radiation-curable resin (Dot Cure TR5903; Taiyo Ink Mfg. Co., Ltd.) was printed in a dot pattern by the screen printing method on the surface having the conductive film in the lower electrode plate, and then irradiated with ultraviolet ray using a high-pressure mercury lamp to arrange spacers having a diameter of 50 μm and a height of 8 μm at 1-mm intervals.

Subsequently, the upper electrode plate and the lower electrode plate were placed such that their conductive films faced each other. The margins were bonded with a double-sided adhesive tape having a thickness of 30 μm and a width of 3 mm to prepare resistive touch panels of Examples 1 to 4.

As a result of writing with the touch panel pens 1 to 4 on the resistive touch panels of Experimental Examples 1 to 4, each touch panel pen produced evaluation results about sounds during writing similar to those shown in Table 2. This result indicates that a touch panel system comprising a touch panel and a touch panel pen in combination can suppress unpleasant sounds during writing provided that the touch panel system satisfies the conditions 1-1 and 1-2.

4. Preparation of Display Device

The writing sheet for a touch panel pen of each of Experimental Examples 1 to 4 was laminated with a commercially available ultra-high-resolution liquid-crystal display device (pixel density: 350 ppi) via an acrylic pressure-sensitive adhesive layer to prepare display devices of Experimental Examples 1 to 4. For the lamination, the base material side of the writing sheet for a touch panel pen faced the display component side.

As a result of writing with the touch panel pens 1 to 4 on the display devices of Experimental Examples 1 to 4, each touch panel pen produced evaluation results about sounds during writing similar to those shown in Table 2.

INDUSTRIAL APPLICABILITY

The method for selecting a writing sheet for a touch panel pen according to the present invention is useful in that the method can accurately select a writing sheet with which the generation of unpleasant sounds during writing is suppressed, and enables the achievement of efficient product design and quality control of writing sheets. The writing sheet for a touch panel pen, the touch panel, the touch panel system and the display device of the present invention are useful in suppressing unpleasant sounds during writing.

REFERENCE SIGNS LIST

1: Base material
2: Resin layer

10: Writing sheet for a touch panel pen
20: Transparent substrate
30: Conductive film
40: Spacer
50: X-axis electrode
60: Y-axis electrode
70: Insulator layer
81: Electronic balance
82: pressure-sensitive adhesive layer
83: Resin plate
90: Sample
100: Touch panel
200: Touch panel pen
300: Sound collector

The invention claimed is:

1. A method for selecting a writing sheet for a touch panel pen, comprising evaluating a writing sheet for the following conditions 1-1 and 1-2, and selecting as the writing sheet for the touch panel pen a sheet that satisfies the following conditions 1-1 and 1-2:

<condition 1-1>
a sound that arises when a touch panel pen is brought into contact with a surface of a writing sheet for a touch panel pen at an acute angle of 25 to 35 degrees and, while maintaining the angle, a vertical load of 45 to 55 gf is applied to the touch panel pen and the touch panel pen is reciprocatingly moved 45 to 55 mm in one-way length at a rate of 180 to 220 mm/sec is recorded;

when recording, the sound is converted from an analog signal to a digital signal at a sampling frequency of 44.1 kHz and recorded; a soundless portion is added to before and after the sound converted into a digital signal so that an overall time period of the digital signal becomes 0.7 seconds; the digital signal to which the soundless portion has been added is subjected to fast Fourier transform in which a range of variables is 1 Hz to 22,000 Hz and the Hanning window is adopted as a window function, and a sound pressure (dB/Hz) is calculated for each 1 Hz;

values of the dB/Hz at frequencies from 1 Hz to 20,000 Hz are normalized to have a maximum value of 100 and a minimum value of 0; the normalized values of dB/Hz are adopted as rated sound pressures P; the frequencies from 1 Hz to 20,000 Hz are divided into ten segments of 2,000 Hz each, and integrated values of the rated sound pressures P of each segment are calculated; when an integrated value of the rated sound pressures P for frequencies of 1 Hz or more to less than 2,000 Hz that is a first segment is represented by $P_1$, and an integrated value of the rated sound pressures P for frequencies of 18,000 Hz or more to 20,000 Hz or less that is a tenth segment is represented by $P_{10}$, $P_1/P_{10}$ exhibits a value of 1.25 or more; and <condition 1-2>
when a standard deviation σ of the integrated values of the rated sound pressures P of the ten segments is calculated, σ exhibits a value of 13,500 or less.

2. The method for selecting a writing sheet for a touch panel pen according to claim 1, further comprising evaluating the sheet for the following condition 2-1 and selecting the sheet as the writing sheet for the touch panel pen if it satisfies the following condition 2-1:

<condition 2-1>
an arithmetic average roughness Ra defined in JIS B0601: 2001 with a cutoff value of 0.8 mm of the surface is 0.2 μm or more and 0.8 μm or less.

3. A touch panel system comprising: a touch panel comprising a writing sheet for a touch panel pen on a surface; and a touch panel pen, wherein the touch panel system satisfies the following conditions 1-1 and 1-2:

<condition 1-1>
a sound that arises when the touch panel pen is brought into contact with a surface of the writing sheet for a touch panel pen at an acute angle of 25 to 35 degrees and, while maintaining the angle, a vertical load of 45 to 55 gf is applied to the touch panel pen and the touch panel pen is reciprocatingly moved 45 to 55 mm in one-way length at a rate of 180 to 220 mm/sec is recorded;

when recording, the sound is converted from an analog signal to a digital signal at a sampling frequency of 44.1 kHz and recorded; a soundless portion is added to before and after the sound converted into a digital signal so that an overall time period of the digital signal becomes 0.7 seconds; the digital signal to which the soundless portion has been added is subjected to fast Fourier transform in which a range of variables is 1 Hz to 22,000 Hz and the Hanning window is adopted as a window function, and a sound pressure (dB/Hz) is calculated for each 1 Hz;

values of the dB/Hz at frequencies from 1 Hz to 20,000 Hz are normalized to have a maximum value of 100 and a minimum value of 0; the normalized values of dB/Hz are adopted as rated sound pressures P; the frequencies from 1 Hz to 20,000 Hz are divided into ten segments of 2,000 Hz each, and integrated values of the rated sound pressures P of each segment are calculated; when an integrated value of the rated sound pressures P for frequencies of 1 Hz or more to less than 2,000 Hz that is a first segment is represented by $P_1$, and an integrated value of the rated sound pressures P for frequencies of 18,000 Hz or more to 20,000 Hz or less that is a tenth segment is represented by $P_{10}$, $P_1/P_{10}$ exhibits a value of 1.25 or more; and <condition 1-2>
when a standard deviation σ of the integrated values of the rated sound pressures P of the ten segments is calculated, σ exhibits a value of 13,500 or less.

4. A writing sheet for a touch panel pen having a surface that satisfies the following conditions 1-1 and 1-2:

<condition 1-1>
a sound that arises when a touch panel pen is brought into contact with a surface of a writing sheet for a touch panel pen at an acute angle of 25 to 35 degrees and, while maintaining the angle, a vertical load of 45 to 55 gf is applied to the touch panel pen and the touch panel pen is reciprocatingly moved 45 to 55 mm in one-way length at a rate of 180 to 220 mm/sec is recorded;

when recording, the sound is converted from an analog signal to a digital signal at a sampling frequency of 44.1 kHz and recorded; a soundless portion is added to before and after the sound converted into a digital signal so that an overall time period of the digital signal becomes 0.7 seconds; the digital signal to which the soundless portion has been added is subjected to fast Fourier transform in which a range of variables is 1 Hz to 22,000 Hz and the Hanning window is adopted as a window function, and a sound pressure (dB/Hz) is calculated for each 1 Hz;

values of the dB/Hz at frequencies from 1 Hz to 20,000 Hz are normalized to have a maximum value of 100 and a minimum value of 0; the normalized values of dB/Hz are adopted as rated sound pressures P; the frequencies from 1 Hz to 20,000 Hz are divided into ten segments of 2,000 Hz each, and integrated values of the rated sound pressures P of each segment are calculated; when an integrated value of the rated sound pressures P for frequencies of 1 Hz or more to less than 2,000 Hz that is a first segment is represented by $P_1$, and an integrated value of the rated sound pressures P for frequencies of 18,000 Hz or more to 20,000 Hz or less that is a tenth segment is represented by $P_{10}$, $P_1/P_{10}$ exhibits a value of 1.25 or more; and <condition 1-2> when a standard deviation σ of the integrated values of the rated sound pressures P of the ten segments is calculated, σ exhibits a value of 13,500 or less.

5. A touch panel comprising a sheet on a surface, wherein a writing sheet for a touch panel pen according to claim 4 is placed as the sheet such that the side that satisfies the conditions 1-1 and 1-2 provides a writing surface the touch panel.

6. A display device with a touch panel, the display device comprising the touch panel on a display component, wherein the touch panel is a touch panel according to claim 5.

* * * * *